US012601602B2

(12) United States Patent
Manning

(10) Patent No.: US 12,601,602 B2
(45) Date of Patent: Apr. 14, 2026

(54) SYSTEMS AND METHODS FOR MULTI-DESTINATION CONTRACTION HIERARCHY PATH SEARCH

(71) Applicant: Verizon Patent and Licensing Inc., Basking Ridge, NJ (US)

(72) Inventor: David P. Manning, Halswell (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 121 days.

(21) Appl. No.: 18/503,550

(22) Filed: Nov. 7, 2023

(65) Prior Publication Data

US 2025/0146827 A1 May 8, 2025

(51) Int. Cl.
*G01C 21/34* (2006.01)
*G01C 21/36* (2006.01)

(52) U.S. Cl.
CPC .............................. G01C 21/3453 (2013.01)

(58) Field of Classification Search
CPC ...................................................... G06G 7/78
See application file for complete search history.

(56) References Cited

U.S. PATENT DOCUMENTS

| | | | | |
|---|---|---|---|---|
| 4,926,336 A | * | 5/1990 | Yamada ............. | G01C 21/3461 |
| | | | | 701/428 |
| 5,729,458 A | * | 3/1998 | Poppen .............. | G06Q 30/0284 |
| | | | | 701/25 |
| 5,757,289 A | * | 5/1998 | Nimura .............. | G01C 21/3415 |
| | | | | 701/417 |
| 5,899,955 A | * | 5/1999 | Yagyu .................. | G08G 1/0969 |
| | | | | 73/178 R |
| 6,047,235 A | * | 4/2000 | Hiyokawa ........ | G08G 1/096861 |
| | | | | 701/410 |
| 6,256,579 B1 | * | 7/2001 | Tanimoto ........... | G01C 21/3484 |
| | | | | 701/425 |
| 2010/0100309 A1 | * | 4/2010 | Hosoi ................ | G01C 21/3446 |
| | | | | 701/532 |
| 2012/0063362 A1 | * | 3/2012 | Hongal ................ | H04L 45/123 |
| | | | | 370/255 |
| 2012/0158299 A1 | * | 6/2012 | Cerecke ............. | G01C 21/3469 |
| | | | | 701/533 |
| 2015/0268054 A1 | * | 9/2015 | Stankoulov ........ | G01C 21/3697 |
| | | | | 701/123 |

* cited by examiner

*Primary Examiner* — Tan Q Nguyen

(57) ABSTRACT

A system described herein may efficiently perform a multi-destination backward search, which may be a part of performing a bidirectional search in a node map that implements contraction hierarchy techniques. Lowest cost paths to each node reachable to each destination node of a set of destination nodes may be computed. A queue may be initialized with the set of destination nodes. For each particular node in the queue, the system may add higher priority neighbors of the particular node to the queue, identify costs of outgoing links from the particular node to the higher priority neighbors, compute lowest cost paths associated with the set of destination nodes based on the identified costs of outgoing links from the particular node to the higher priority neighbors and any previously computed lowest cost paths associated with the set of destination nodes, and increment to a next node in the queue.

20 Claims, 27 Drawing Sheets

| Link source | Link target | Cost |
|---|---|---|
| G | E | 1 |
| F | E | 3 |
| F | D | 1 |
| E | D | 1 |
| E | C | 4 |
| E | A | 5 |
| D | C | 2 |
| D | B | 10 |
| C | B | 2 |

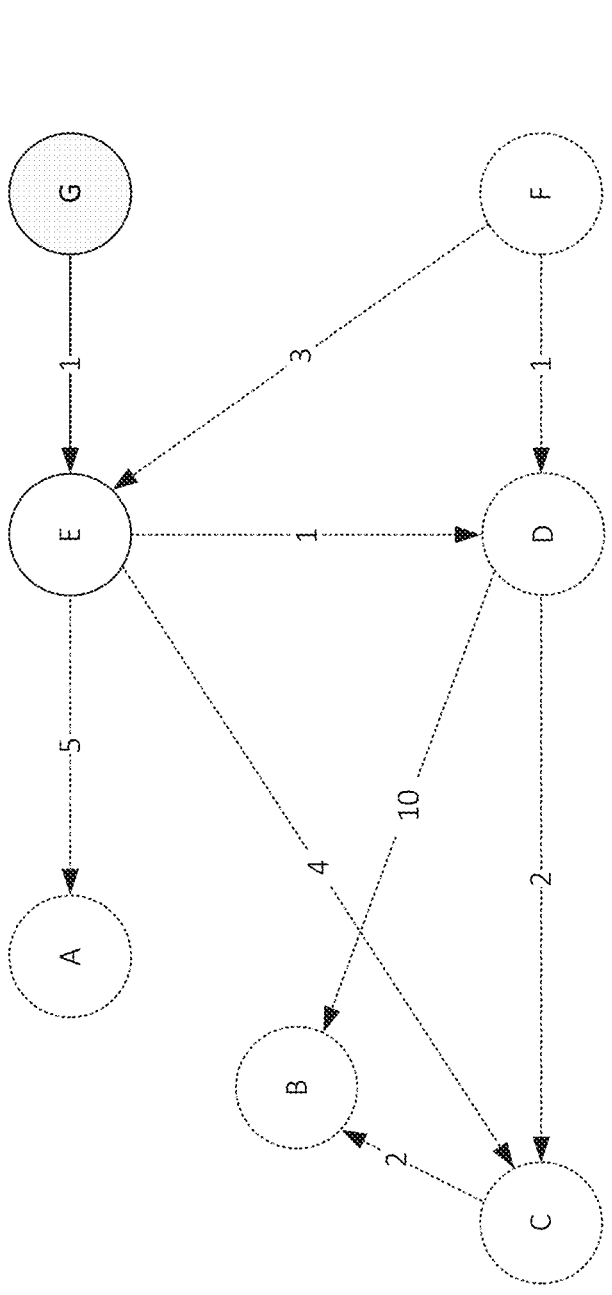
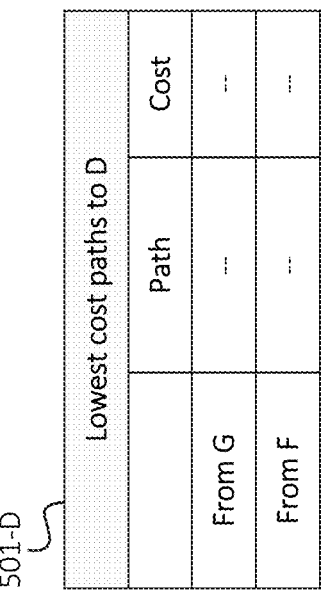
Lowest cost paths to D
| 501-D | | Path | Cost |
|---|---|---|---|
| | From G | -- | -- |
| | From F | -- | -- |
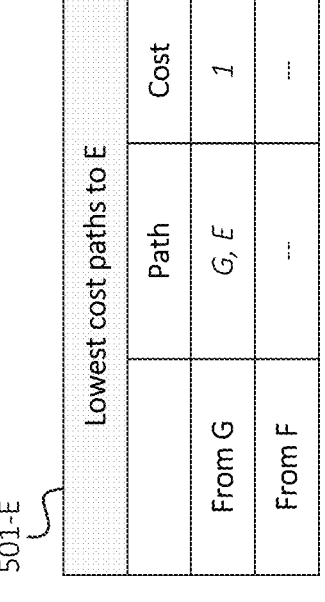
Lowest cost paths to E
| 501-E | | Path | Cost |
|---|---|---|---|
| | From G | G, E | 1 |
| | From F | -- | -- |
FIG. 5
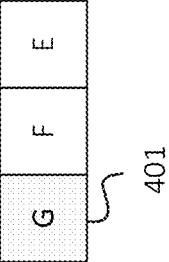
| G | F | E |
|---|---|---|
401

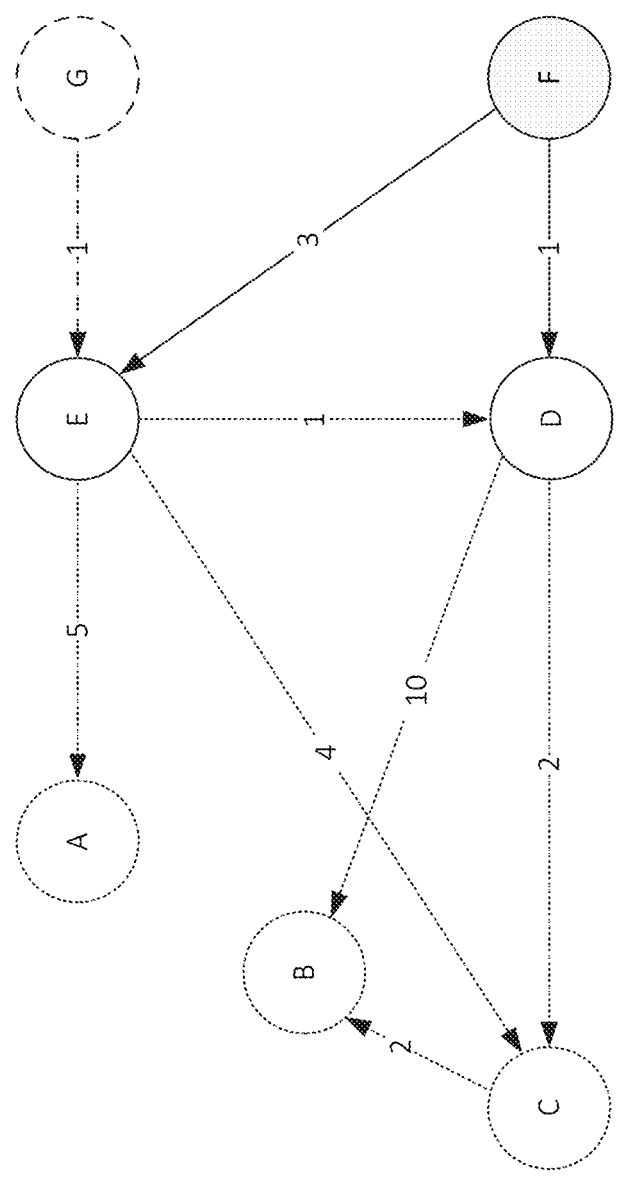
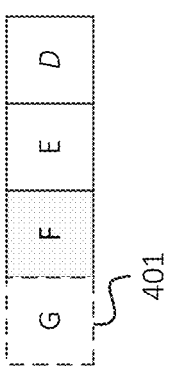
FIG. 6

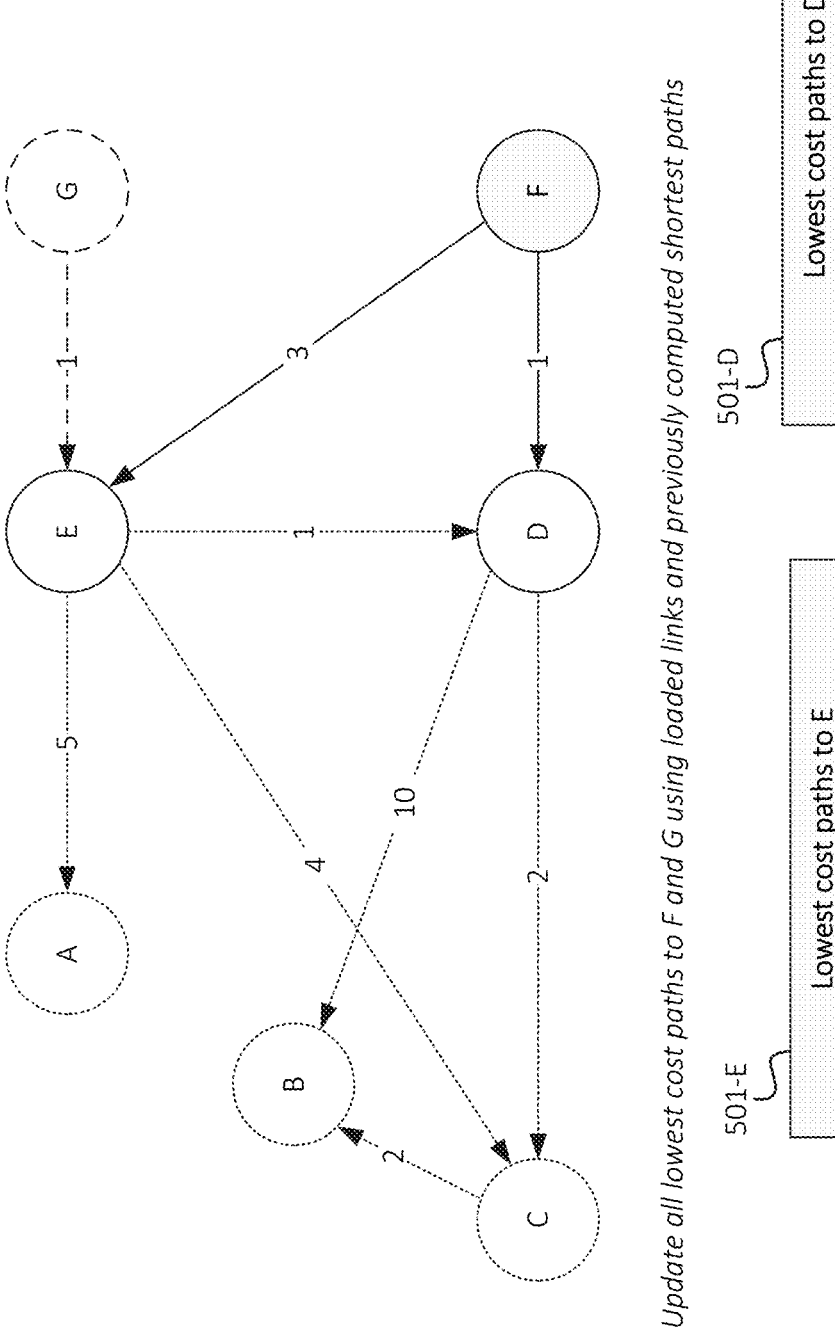
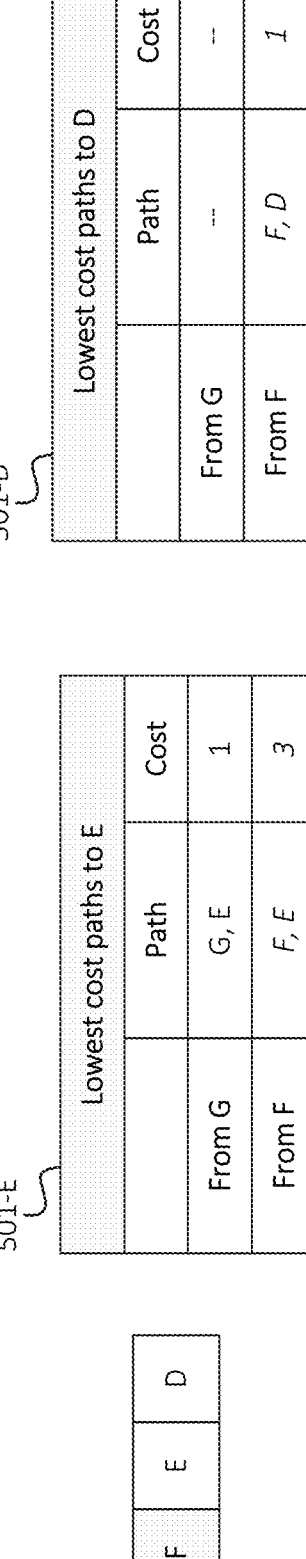
*Update all lowest cost paths to F and G using loaded links and previously computed shortest paths*
Lowest cost paths to D
501-D
| | Path | Cost |
|---|---|---|
| From G | -- | -- |
| From F | F, D | 1 |
Lowest cost paths to E
501-E
| | Path | Cost |
|---|---|---|
| From G | G, E | 1 |
| From F | F, E | 3 |
| G | F | E | D |
|---|---|---|---|
401
FIG. 7

Load all outgoing links of Node E into memory, add neighbors to backward search queue

501-A

| Lowest cost paths to A | | |
|---|---|---|
| | Path | Cost |
| From G | G, E, A | 6 |
| From F | F, E, A | 8 |

501-E

| Lowest cost paths to E | | |
|---|---|---|
| | Path | Cost |
| From G | G, E | 1 |
| From F | F, E | 3 |

501-C

| Lowest cost paths to C | | |
|---|---|---|
| | Path | Cost |
| From G | G, E, C | 5 |
| From F | F, E, C | 7 |

501-D

| Lowest cost paths to D | | |
|---|---|---|
| | Path | Cost |
| From G | G, E, D | 2 |
| From F | F, D | 1 |

401

| G | F | E | D | C | A |
|---|---|---|---|---|---|

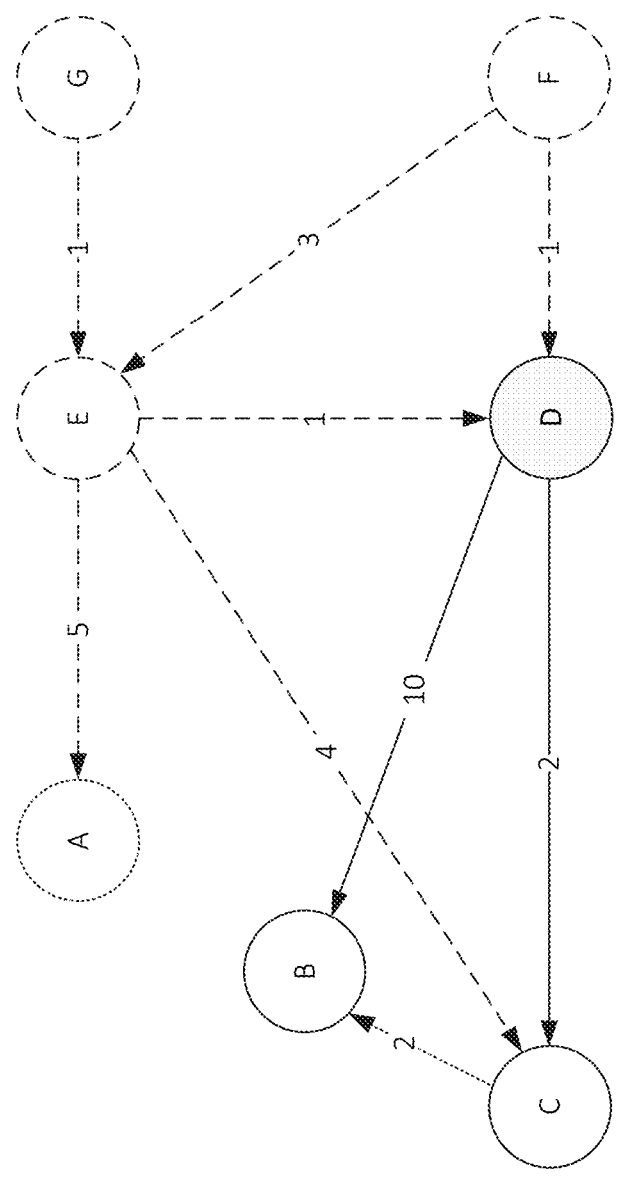
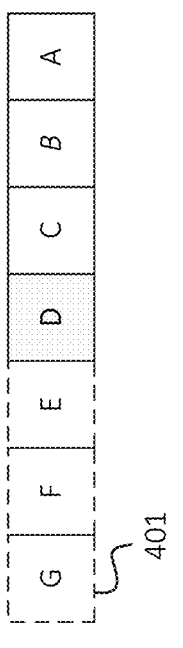
FIG. 10

Lowest cost paths to A — 501-A

|        | Path    | Cost |
|--------|---------|------|
| From G | G, E, A | 6    |
| From F | F, E, A | 8    |

Lowest cost paths to B — 501-B

|        | Path       | Cost |
|--------|------------|------|
| From G | G, E, D, B | 12   |
| From F | F, D, B    | 11   |

Lowest cost paths to C — 501-C

|        | Path       | Cost |
|--------|------------|------|
| From G | G, E, D, C | 4    |
| From F | F, D, C    | 3    |

Lowest cost paths to D — 501-D

|        | Path    | Cost |
|--------|---------|------|
| From G | G, E, D | 2    |
| From F | F, D    | 1    |

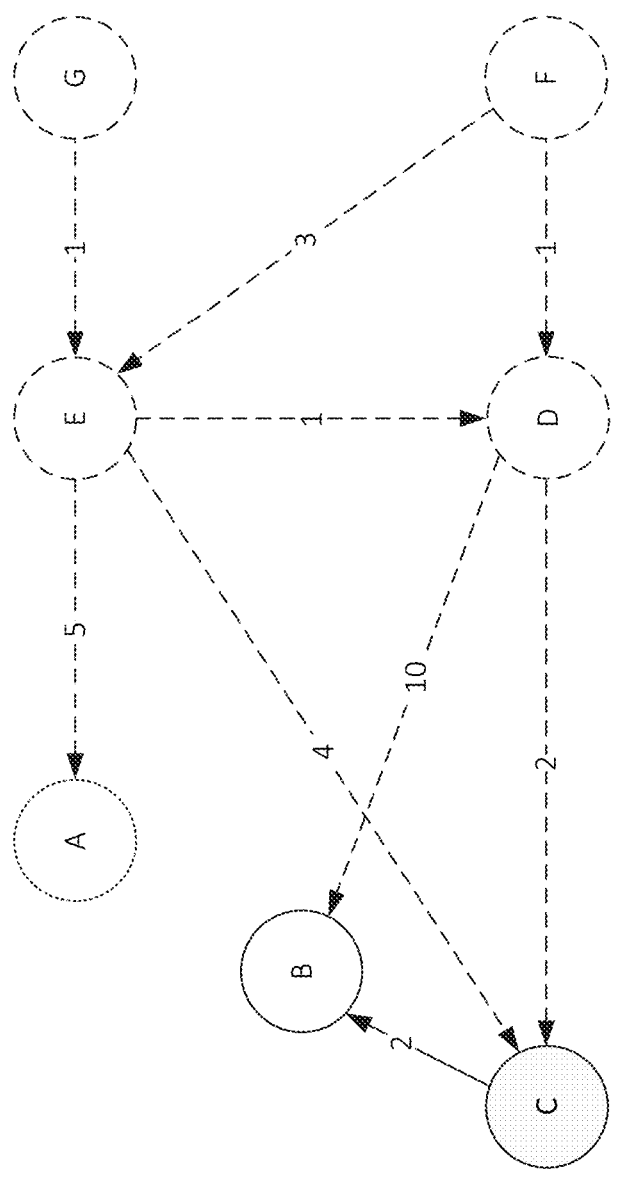
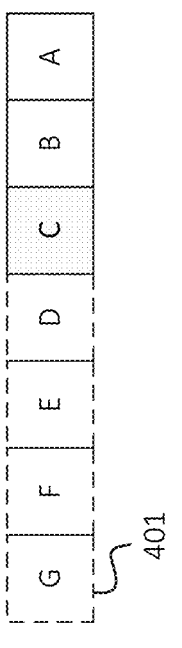
FIG. 12

501-A

Lowest cost paths to A

| | Path | Cost |
|---|---|---|
| From G | G, E, A | 6 |
| From F | F, E, A | 8 |

501-B

Lowest cost paths to B

| | Path | Cost |
|---|---|---|
| From G | G, E, D, C, B | 6 |
| From F | F, D, C, B | 5 |

501-C

Lowest cost paths to C

| | Path | Cost |
|---|---|---|
| From G | G, E, D, C | 4 |
| From F | F, D, C | 3 |

501-D

Lowest cost paths to D

| | Path | Cost |
|---|---|---|
| From G | G, E, D | 2 |
| From F | F, D | 1 |

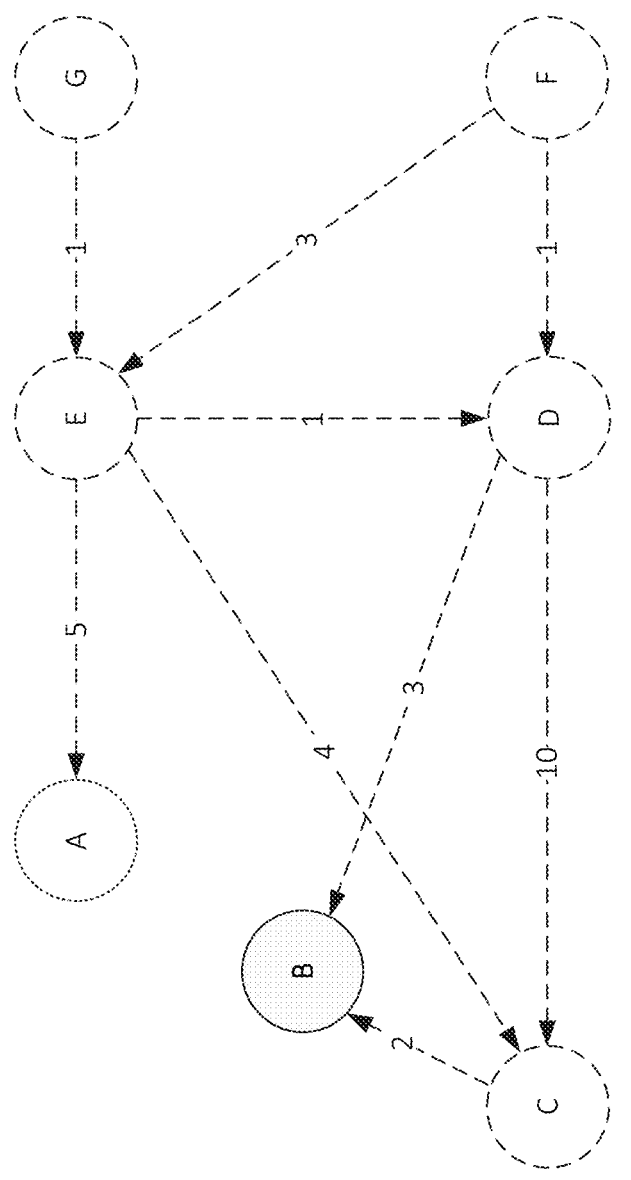
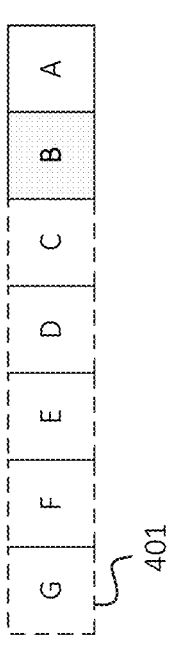
FIG. 14

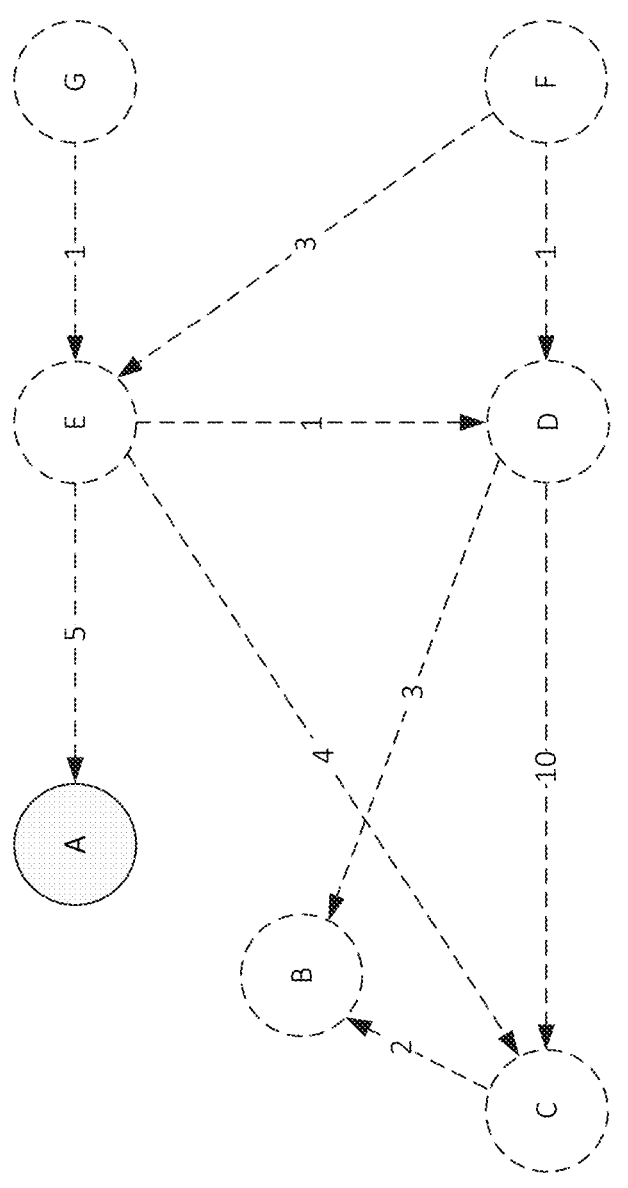
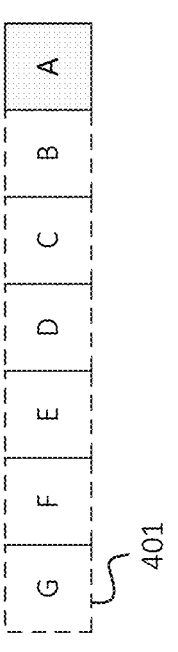
FIG. 15

*Lowest cost paths of backward
search for destination Nodes G and F*

| Lowest cost paths from G | | |
| --- | --- | --- |
| Node | Path | Cost |
| E | G, E | 1 |
| D | G, E, D | 2 |
| A | G, E, A | 6 |

1701

| Lowest cost paths from G | | |
|---|---|---|
| Node | Path | Cost |
| E | G, E | 1 |
| D | G, E, D | 2 |
| A | G, E, A | 6 |
| C | G, E, D, C | 4 |
| B | G, E, D, C, B | 6 |

1701

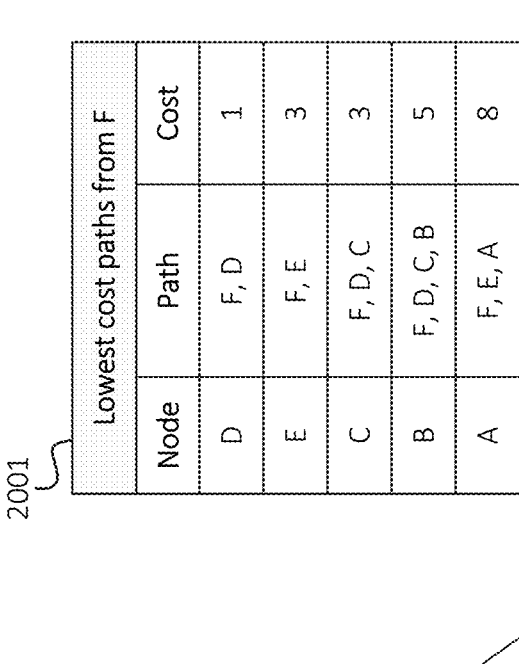
| Lowest cost paths from F | | |
|---|---|---|
| Node | Path | Cost |
| D | F, D | 1 |
| E | F, E | 3 |
| C | F, D, C | 3 |
| B | F, D, C, B | 5 |
| A | F, E, A | 8 |
2001
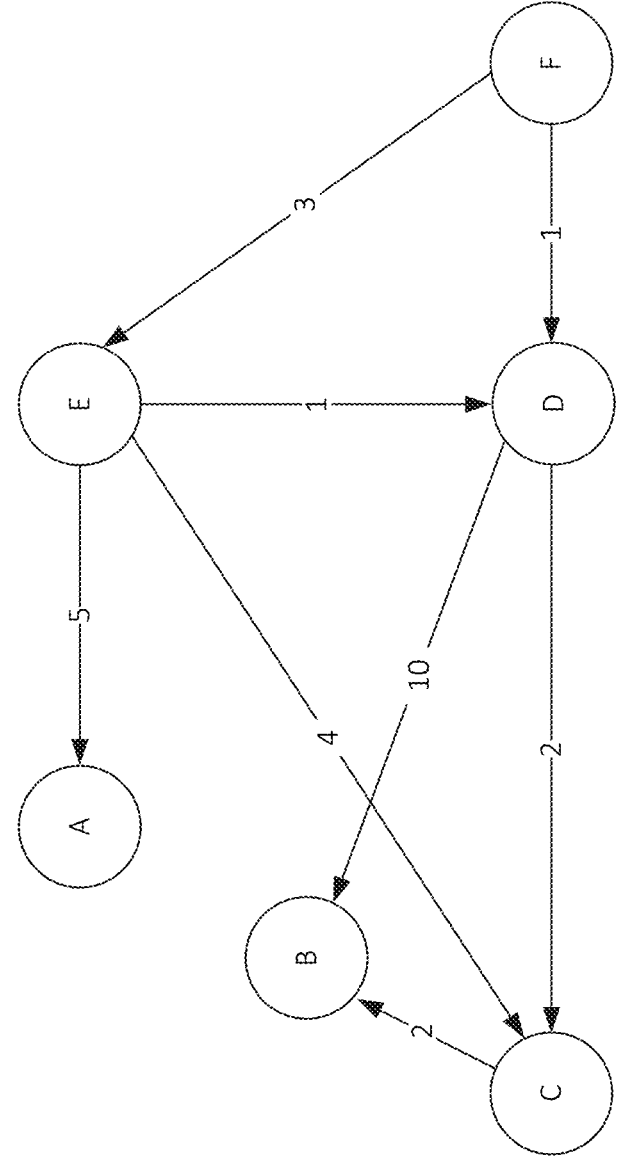
FIG. 20

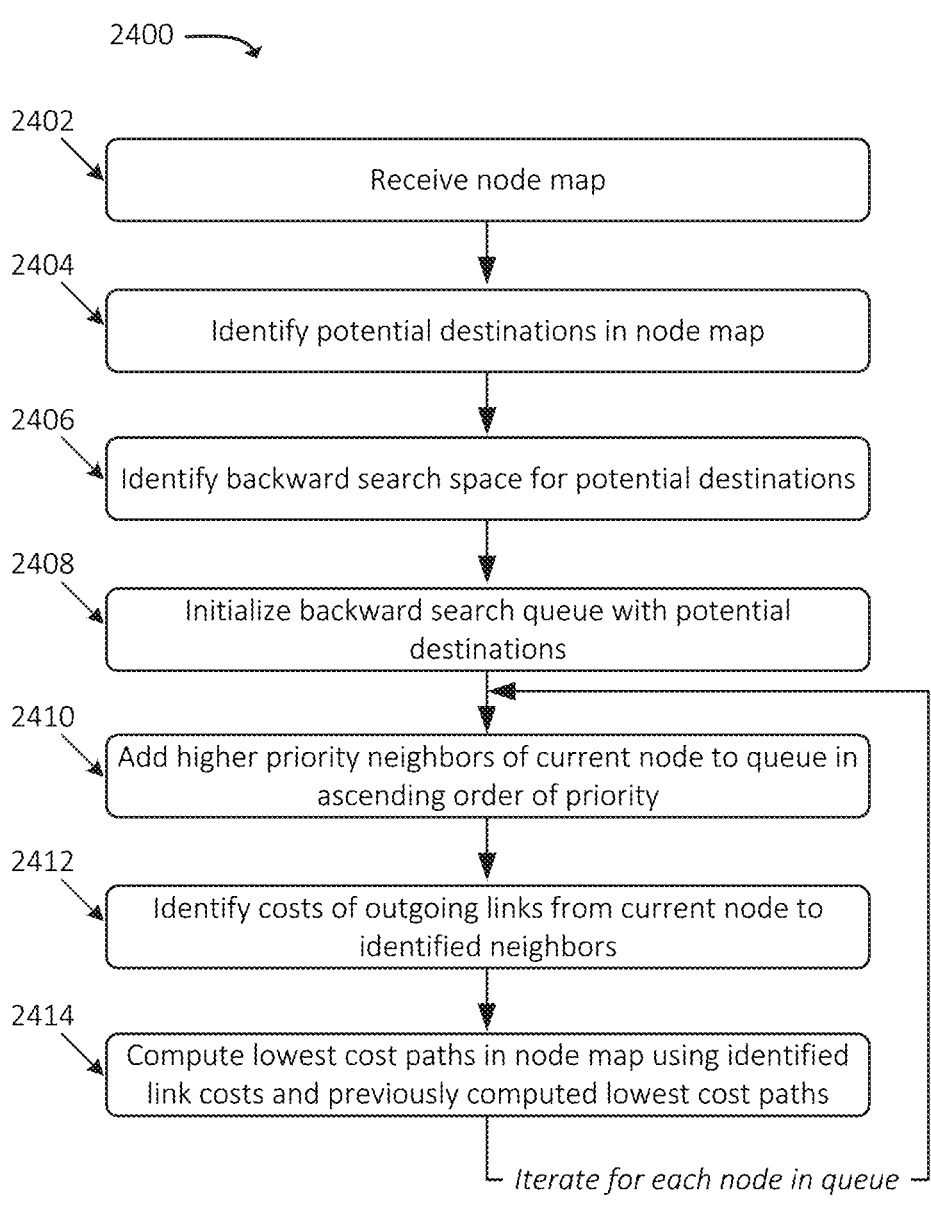

2400

2402 — Receive node map

2404 — Identify potential destinations in node map

2406 — Identify backward search space for potential destinations

2408 — Initialize backward search queue with potential destinations

2410 — Add higher priority neighbors of current node to queue in ascending order of priority 2412 — Identify costs of outgoing links from current node to identified neighbors 2414 — Compute lowest cost paths in node map using identified link costs and previously computed lowest cost paths

*Iterate for each node in queue*

2502 — Receive navigation request from starting point to destination

2504 — Generate navigation instructions based on node map and costs associated with links, including costs determined based on constraint regions 2506 — Provide navigation instructions

SYSTEMS AND METHODS FOR MULTI-DESTINATION CONTRACTION HIERARCHY PATH SEARCH

BACKGROUND

Navigation systems may have the ability to generate turn-by-turn navigation directions from arbitrary starting points to arbitrary destinations. Some systems may precompute directions for commonly traveled routes using contraction hierarchies or other similar techniques, in which a set of turns, paths, or the like are contracted into a single "shortcut" that represents the turns, paths, etc. Such precomputed shortcuts may be used when generating particular navigation instructions at "query" time from a particular starting point to a particular destination, thus saving time and processing resources that would otherwise be expended after the query is received.

BRIEF DESCRIPTION OF THE DRAWINGS

FIGS. 4-8, 9A, 9B, and 10-16 illustrate an example multi-destination backward search in accordance with some embodiments;

FIGS. 17-20 illustrate an example of a series of per-destination backward searches;

FIG. 24 illustrates an example process for performing a multi-destination backward search in accordance with some embodiments;

DETAILED DESCRIPTION OF EXAMPLE EMBODIMENTS

The following detailed description refers to the accompanying drawings. The same reference numbers in different drawings may identify the same or similar elements.

Embodiments described herein provide for the efficient computation of costs in a node map, such as during one or more phases of a bidirectional search in which lowest cost paths are determined between starting and destination nodes of the node map. "Costs" may refer to various metrics, parameters, characteristics, etc. of links between nodes. Costs may be based on real-world measurements, simulations, models, etc. Costs may be based on average values, median values, peak values, minimum values, etc. associated with the traversal of particular links. Costs may refer to, for example, the amount of time taken to traverse from one node to another, the amount of fuel expended to traverse from one node to another, or other types of factors. Nodes of the node map may represent intersections, landmarks, markers, locations, addresses, tunnel entrances or exits, or other objects or indicators. The node map may also include links between respective nodes. In some instances, links may represent one or more roads, and nodes may represent intersections between roads, road signs, zone markers (e.g., the entrance or exit to a school zone, a construction zone, a tunnel, a bridge, etc.), or other objects associated with roads.

The node map may include "shortcut" links between some nodes, where a shortcut link represents multiple links between multiple nodes. The shortcut link may be added to the node map (e.g., may replace the component nodes and links in the node map, and/or may be added in addition to the component nodes and links), such that when the node map is used for a solution to a query (e.g., a shortest path solution, a lowest cost solution, a set of navigation instructions in response to a navigation request, or the like), the shortcut link may be used in lieu of computing a path through the component nodes and links of the shortcut link. The navigation instructions may, for example, be generated or used by a fleet management system, which may provide navigation instructions to various vehicles in one or more fleets. Such fleets may include fleets of delivery vehicles, personnel transport vehicles, buses, rideshare vehicles, or the like. In some embodiments, the navigation instructions may be generated or utilized by personal navigation systems, such as navigation systems installed in an individual's automobile or mobile device.

Figure 1:
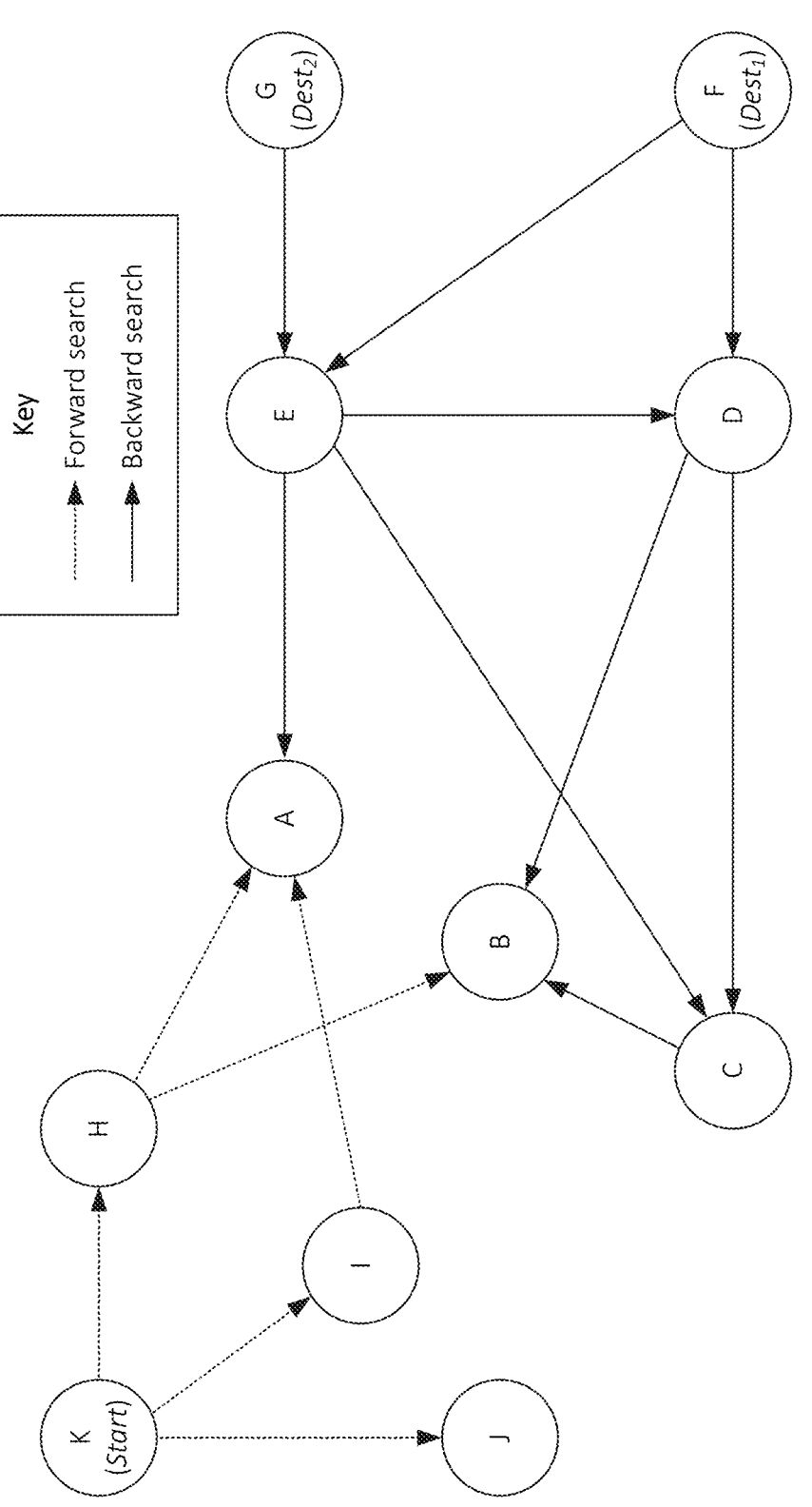
FIG. 1 illustrates an example node map that employs contraction hierarchy techniques.

Different nodes may be associated with different levels of priority, importance, or the like. For example, a node of relatively low priority may represent one or more local roads through a neighborhood, while a node of relatively high priority may represent a section of a large interstate highway. A bidirectional search of the node map may, as shown in FIG. 1, include a first search (e.g., a forward search) from a node of the node map that is designated as a starting location (e.g., Node K), and a second search (or a second set of searches), also referred to as a backward search, from one or more nodes of the node map that are designated as potential destinations from the starting node (i.e., Nodes F and G in the examples discussed herein). The forward and backward searches may each be performed in order of ascending priority. In the node map discussed herein (e.g., with respect to FIG. 1 and subsequent figures), nodes are indicated in descending order of priority, such that Node A is the highest priority node, Node B is the second highest priority node, and so on. Thus, the forward search from Node K may include traversing from Node K to Nodes A and B through Nodes H and/or I, and backward searches from the two potential destination Nodes F and G may include traversing to Nodes A and B through Nodes C, D, and/or E. In situations where the forward and backward searches meet (e.g., at Nodes A and B), a complete path may be identified. For example, multiple paths from K to G may be identified, such as Path {K, H, A, E, G} and Path {K, I, A, E, G}. Additionally, multiple paths from K to F may be identified, including Path {K, I, A, E, D, F}. As discussed below, costs or other suitable metrics associated with these various paths may be used to identify a lowest cost, or otherwise best or most optimal, path from the starting point (e.g., Node K) to each of the potential destinations (e.g., Nodes F and G). In this manner, the lowest cost paths from the forward search and the backward search may be used to ultimately find the lowest cost complete path from the starting point to each of the potential destinations.

Embodiments described herein provide for an efficient mechanism to perform the backward search portion of a bidirectional search, which may save time and computing resources as compared to other mechanisms for performing the backward search. For example, as discussed below, the techniques described herein make efficient use of memory (e.g., processor cache) by computing the lowest cost paths from multiple potential destinations (e.g., performing the backward search) in a batch processing manner rather individually computing lowest cost paths for each destination in a sequential manner. Since the evaluation of paths on a per-destination basis is likely to be performed in a variable sequence and the path costs are further dependent on paths associated with each individual destination, node information may be required to be loaded numerous times in order to sequentially determine the lowest cost path to each destination.

Due to the hierarchical nature of the node map, the techniques described herein may require far fewer memory load operations (e.g., loading node information to processor cache) than individually computing lowest cost paths for each destination. For example, since the embodiments described below compute path costs based on node priority, a node of higher priority may be "relaxed" or otherwise no longer needed to be loaded to memory once it is loaded and the costs of paths through the node are computed. Since nodes are evaluated in a hierarchical manner in accordance with embodiments described herein (e.g., in descending order of priority of nodes), the node map may be evaluated in the same sequence for multiple potential destinations, thus greatly reducing the quantity of times any given node is required to be loaded to memory (e.g., processor cache). The reduced memory loading operations may ultimately yield far greater performance than implementations that calculate path costs for a backward search on a per-destination basis.

Figure 2:
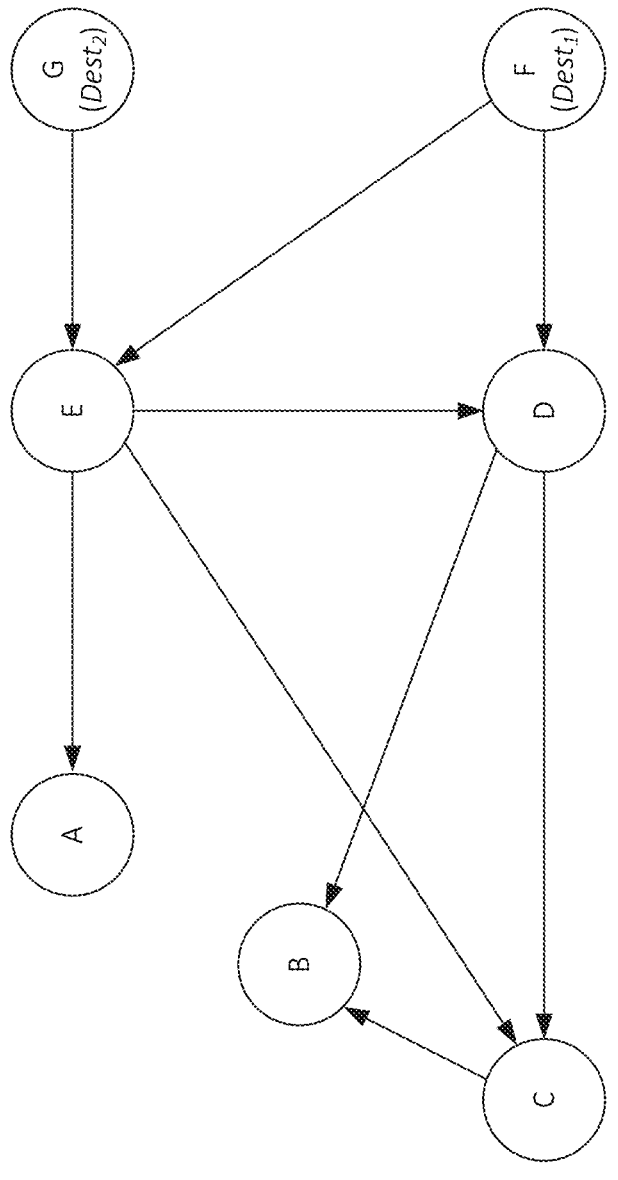
FIG. 2 illustrates an example of selecting a search space for a backward search for a set of destinations in a node map.

As shown in FIG. 2, the backward search procedure of some embodiments may include identifying a set of destinations of a node map on which to perform the backward search, as well as nodes that are reachable from the destinations in accordance with contraction hierarchy techniques. In the examples discussed herein, Nodes F and G are the identified destinations. In practice, several destinations may be identified (e.g., dozens, hundreds, thousands, etc.) and evaluated using techniques described herein.

Nodes A-E may be identified as nodes that are reachable from Node F and/or Node G in accordance with contraction hierarchy techniques (e.g., in ascending order of priority), while other nodes of the node map (e.g., Nodes H-J) may be identified as nodes that are not reachable from Node F and/or Node G in accordance with contraction hierarchy techniques. That is, for instance, while paths exist from Node G to Node H (e.g., Path {G, E, A, H}) and from Node F to Node H (e.g., Path {F, E, A, H}), such paths would require traversing from a higher priority node (Node A) to a lower priority node (Node H), which is an invalid traversal for the backward search. Since all paths to Node H are invalid for the backward search, Node H is considered unreachable from Nodes F and G.

Figure 3:
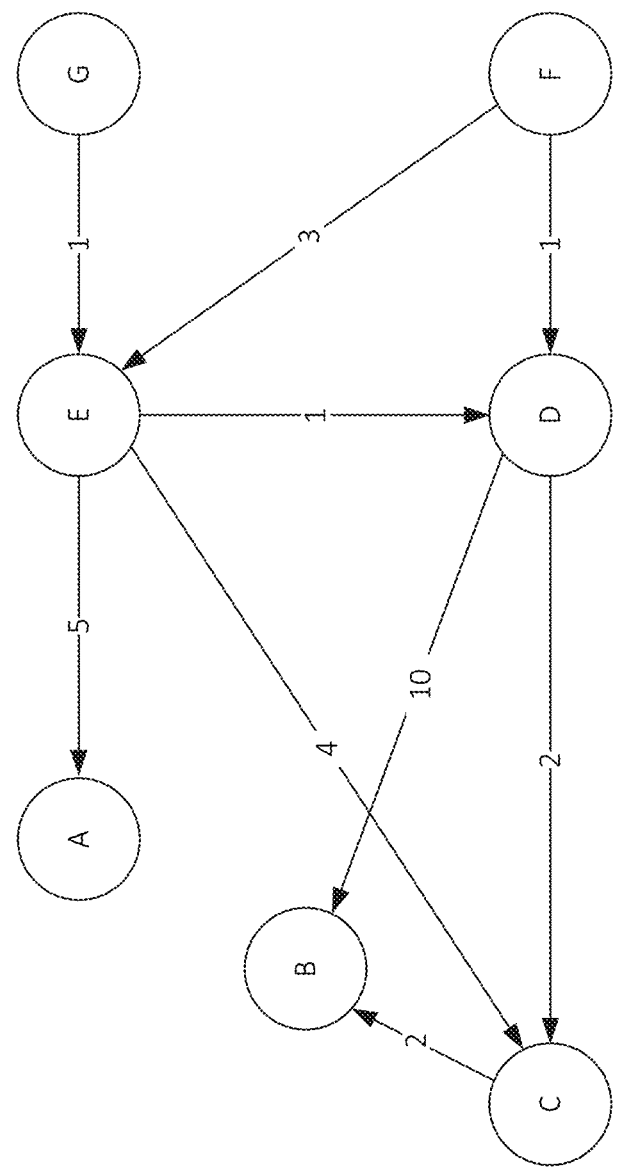
FIG. 3 illustrates example link costs in a node map.

As shown in FIG. 3, costs for the links between nodes may be identified. As discussed above, costs may refer to various metrics, parameters, characteristics, etc. of the links, such as the amount of time taken to traverse from one node to another, the amount of fuel expended to traverse from one node to another, or other types of factors. As one example, the link from Node E to Node G (referred to as Link {G, E}) may have a cost of 1, while Link {D, B} may have a cost of 10 (e.g., a higher cost).

For the sake of clarity, links and paths of the backward search are referred to herein in the backward search direction, while ultimately the results of a bidirectional search would refer to the same links and paths in the opposite direction. For example, Link {G, E} of the backward search would ultimately refer to Link {E, G} in the result of a bidirectional search that includes the backward search.

Figure 4:
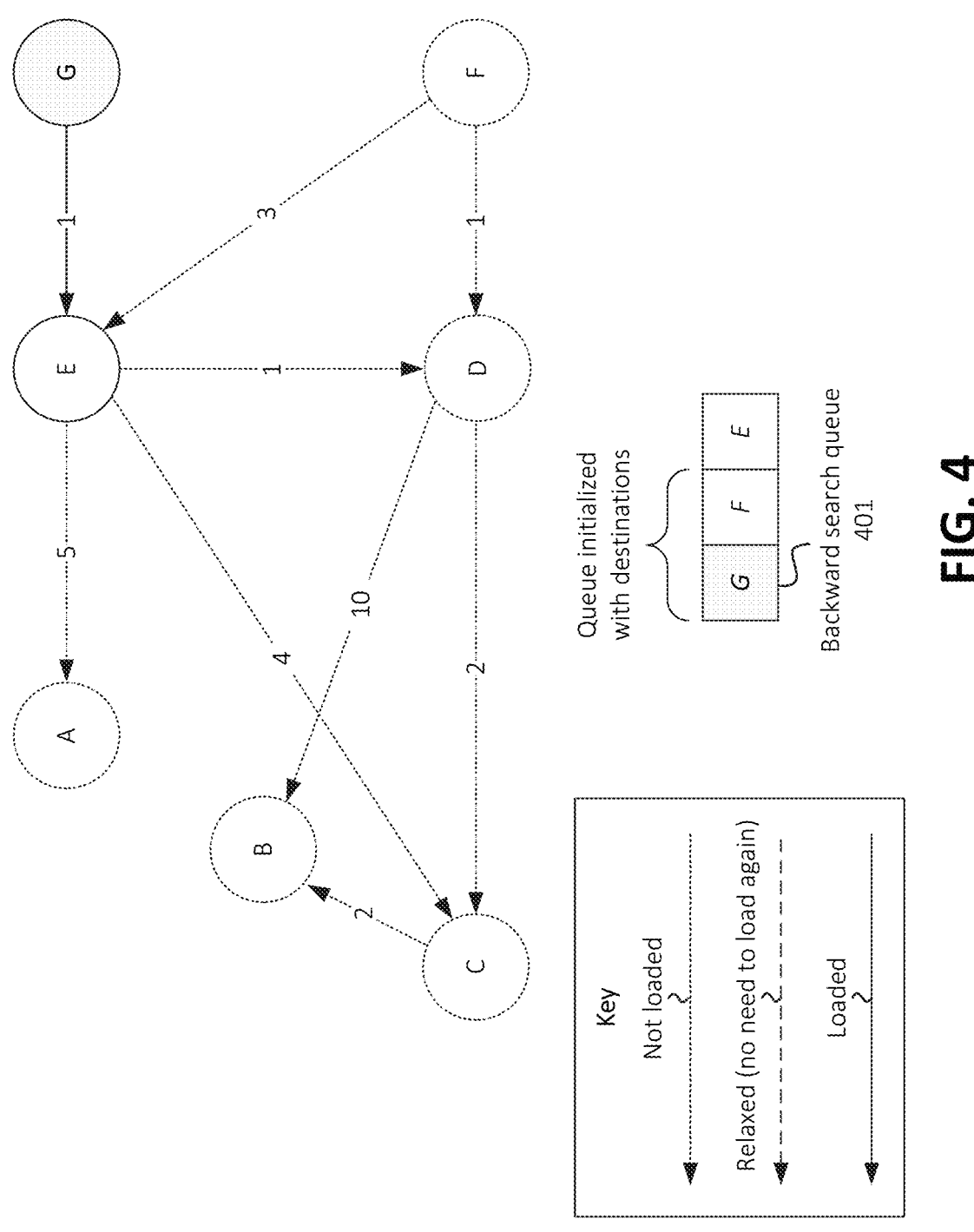

Once the destinations (Nodes F and G) and the reachable nodes (Nodes A-E) are identified, a backward search queue may be initialized, where such backward search queue indicates the sequence in which paths from particular nodes to the destinations are to be evaluated. For example, as shown in FIG. 4, backward search queue 401 may be initialized with candidate destination Nodes F and G. In accordance with some embodiments, nodes may be added to backward search queue 401 in ascending order of priority. As shown, Node G may be placed in a first position of backward search queue 401, and Node F may be placed in a second (e.g., subsequent) position of backward search queue 401.

Once backward search queue 401 is initialized with the destination nodes, evaluation of the nodes in backward search queue 401 may begin with the node at the head of the queue (i.e., Node G in this example). In the examples herein, the shading and bolding of a given node indicates that such node is being evaluated as discussed below. Evaluating a given node, as discussed herein, may include identifying higher priority neighboring nodes, adding such neighboring nodes to backward search queue 401, loading costs of links to such neighboring nodes into memory, and identifying lowest cost paths to the destinations using the information loaded into memory. As shown in FIG. 4, for example, Node G may be evaluated, as Node G is the current head of backward search queue 401 (e.g., the lowest priority node of backward search queue 401 that has not yet been evaluated).

In the examples of FIGS. 4, 6, 8, 10, 12, 14, and 15, different types of lines represent different statuses of nodes and/or links with respect to loading respective information into memory. As reflected in the key shown in FIG. 4, a dotted line refers to information that is not loaded to memory in a current stage of the backward search procedure. A dashed line refers to "relaxed" information that will no longer need to be loaded to memory, and a solid line refers to information that is loaded to memory in a current stage of the backward search procedure.

As noted above, evaluating Node G may include identifying all higher priority neighbor nodes (e.g., nodes that are directly linked to Node G), which is only Node E in this situation. As such, Node E may be added to backward search queue 401, and Link {G, E} may be loaded into memory. As discussed above, Node E may be added to the end of backward search queue 401, as Node E is the highest priority node added to backward search queue 401 so far.

FIG. 5 illustrates an example of computing lowest cost paths from destination Nodes F and G using the information that has been loaded and/or evaluated so far. In the examples discussed herein, respective data structures 501 may be used to indicate the lowest path costs to a particular node in the node map from each destination node. For example, data structure 501-D indicates (a) the lowest cost path from Node F to Node D and (b) the lowest cost path from Node G to Node D. Similarly, data structure 501-E indicates (a) the lowest cost path from Node F to Node E and (b) the lowest cost path from Node G to Node E. In this iteration of the procedure, as noted above, Node E is the only higher priority node immediately reachable from Node G, and therefore the only link loaded as of this iteration is Link {G, E}.

As such, using all available information to determine lowest cost paths to Nodes F and G at this stage may include using only the information that the link cost of Link {G, E} is 1. Since this link is a path that leads to a destination node (i.e., Node G), data structure 501-E may be updated to reflect that the lowest cost path to Node E, from Node G, is Path {G, E} with a total cost of 1. That is, data structures 501 may be updated with all available information which, at this stage, includes only updating data structure 501-E in the manner discussed above. For example, data structure 501-D may remain empty, may include null values, etc., which reflects that no paths have yet been discovered between Node F and Node D or between Node G and Node D.

As noted above, data structures 501 may be maintained to reflect the lowest cost paths found from particular nodes to each destination node, based on the paths computed during each iteration. Because these data structures 501 maintain the shortest paths from each node to each destination node, it is unnecessary to reload the links of such paths when computing paths to the destination nodes in future iterations. Additionally, the shortest paths found with respect to an evaluated node (e.g., the shortest path from the evaluated node and the set of destination nodes) is guaranteed to the be shortest path to the evaluated node from the set of destination nodes, as all valid paths (e.g., paths in ascending order of priority) to the evaluated node have been computed as of the time of evaluation of the node. In this manner, nodes that are evaluated may be considered as "relaxed," as the outgoing links from relaxed nodes do not need to again be reloaded into memory.

FIGS. 6 and 7 illustrate the next iteration of the backward search procedure of some embodiments. As shown in FIG. 6, Node G may be considered as "relaxed" at this point, as Node G has been evaluated in the previous iteration, as discussed above with respect to FIGS. 4 and 5. That is, the outgoing links from Node G (namely, Link {G, E}) need not be evaluated again, as the shortest path from Node E to Node G (other than paths that include higher priority nodes than Node E) has been found.

The procedure may continue to evaluate the next node in backward search queue 401, which is Node F in this example. The immediate higher priority nodes of node F may be identified and added to backward search queue 401, if not already in backward search queue 401. In this example, Nodes D and E are identified. Node D may be added to backward search queue 401, as Node E is already in backward search queue 401. Additionally, Node D may be placed at the end of backward search queue 401, as Node D is the highest priority node in backward search queue 401. At this stage, the outgoing links of Nodes A-E are not loaded into memory, while the outgoing links of Node F to higher priority neighbors (i.e., Link {F, D} and Link {F, E}) are loaded into memory. For example, the costs of these links may be loaded into memory.

As shown in FIG. 7, the lowest cost paths to Nodes F and G may be updated using the information loaded to memory (e.g., the link costs of the outgoing links of Node F to its higher priority neighbors) as well as the previously computed shortest paths as reflected by data structures 501. At this iteration, data structure 501-D may be updated to reflect that the lowest cost path to Node D from Node F is Path {F, D}, while data structure 501-D may continue to not include a lowest cost path to Node D from Node G (i.e., since no such path has yet been discovered). Additionally, data structure 501-E may be updated to reflect that a path to Node E from Node F has been found, and the cost of such path is 3.

Figure 8:
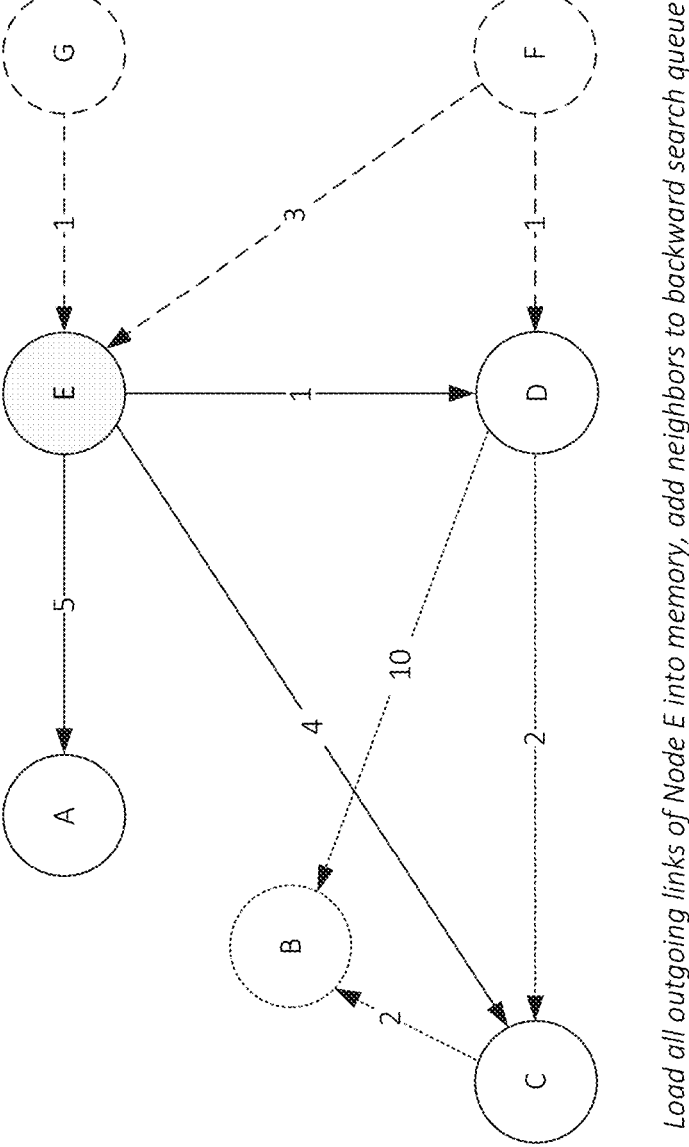

As shown in FIG. 8, after Node F has been evaluated, Node F may be relaxed. At this stage, Nodes F and G are relaxed. The procedure may continue with identifying that the next node in backward search queue 401 is Node E, and the links to the higher priority neighbors of Node E may be identified. In this example, the link costs of Link {E, A}, Link {E, B}, and Link {E, D} may be loaded into memory.

Figure 9A:
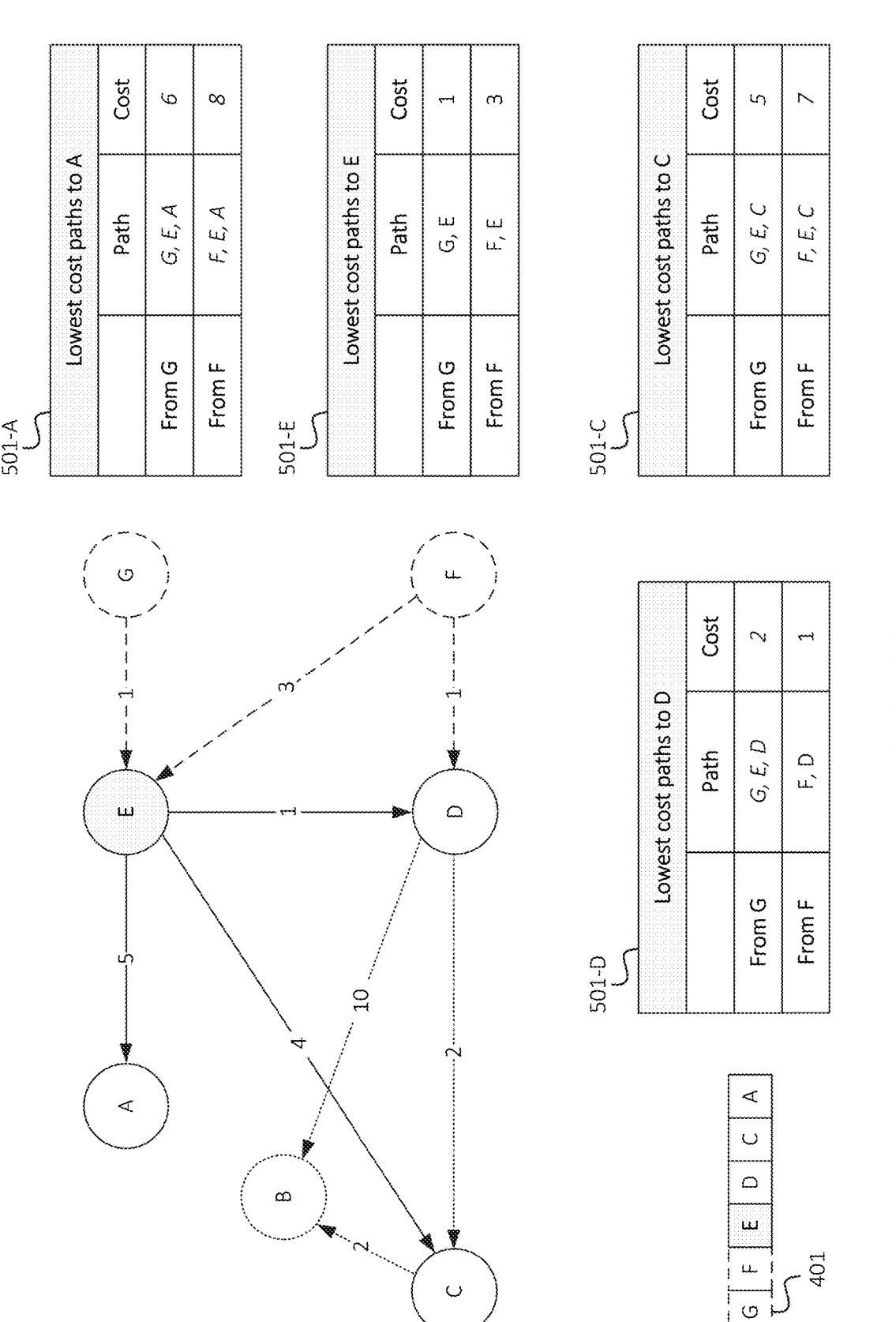

As shown in FIG. 9A, the lowest paths to Nodes F and G (e.g., as reflected by data structures 501) may be updated based on the information loaded into memory with respect to evaluating Node E (i.e., the link costs of Link {E, A}, Link {E, B}, and Link {E, D}), and further based on the previously computed shortest paths (e.g., as reflected in data structures 501 based on previous iterations).

For example, with respect to the lowest cost paths associated with Node C, data structure 501-C may reflect that the lowest cost path to Node F is Path {F, E, C} and that the lowest cost path to Node D is Path {G, E, C}. The costs of these paths may be computed without loading intervening link costs that were previously loaded (e.g., the link costs of Link {F, E} and Link {G, E}). Instead, the lowest cost paths from Node E to Nodes F and G (e.g., as reflected in data structure 501-E) may be used to determine the path costs of Path {F, E, C} and Path {G, E, C}.

Figure 9B:
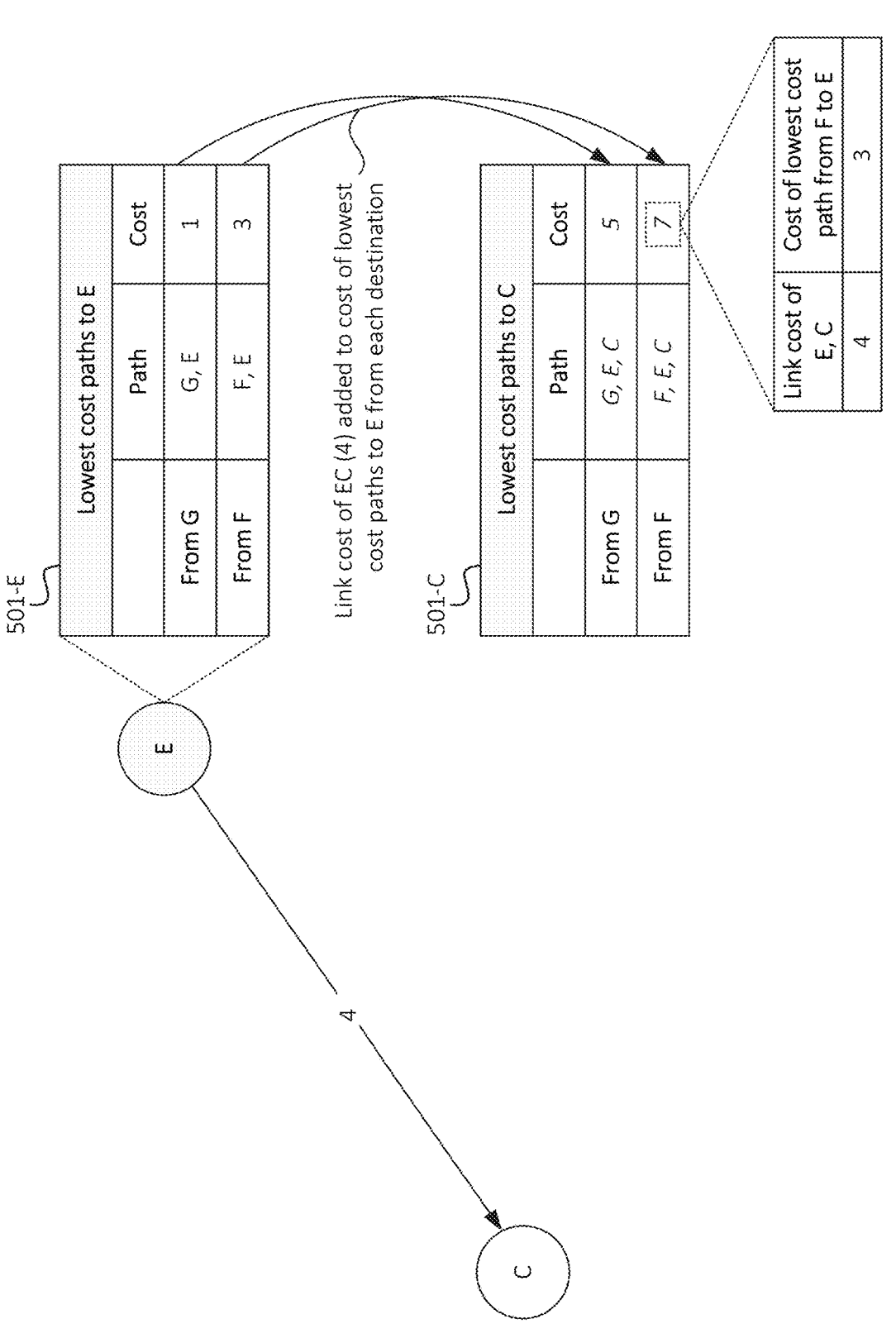

For example, as shown in FIG. 9B, the link cost of Link {E, C} is 4. Data structure 501-E, which maintains the shortest path to Node E from destination Nodes F and G, may be used to compute the costs of paths to Node C, through Node E, from destination Nodes F and G. For example, the cost of Path {F, E} may be added to the cost of Link {E, C} to ultimately determine the cost of Path {F, E, C}. Similarly, the cost of Path {G, E} may be added to the cost of Link {E, C} to ultimately determine the cost of Path {G, E, C}.

Returning to FIG. 9A, data structure 501-A may also be updated to reflect that paths were discovered from Nodes F and G to Node A, and that a path was discovered from Node G to Node D. As shown in FIG. 10, once Node E has been evaluated, Node E may be considered as relaxed (e.g., the link costs of outgoing links of Node E need not be loaded into memory again). The next node in backward search queue 401 (i.e., Node D) may be identified, and its higher priority neighbors may be added and added to backward search queue 401. Here, Nodes B and C are the higher priority neighbors of Node D. Since Node C is already in backward search queue 401, Node C need not be added to backward search queue 401 again. Node B may be added to backward search queue 401. Further, Node B may be placed ahead of Node A, which was already present in backward search queue 401, as Node B is a lower priority node than Node A.

Figure 11:
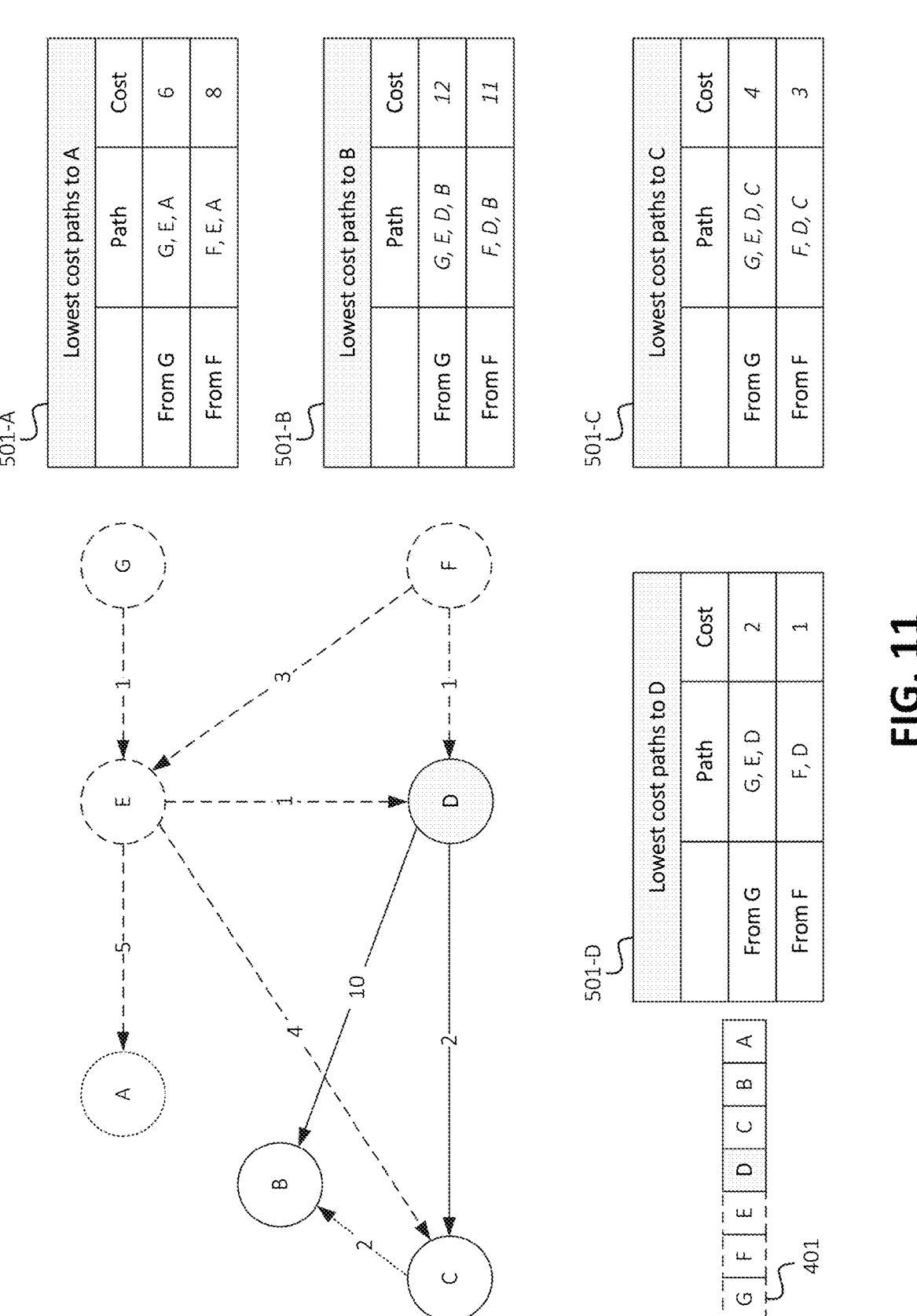

As shown in FIG. 11, the lowest path costs of data structures 501 (e.g., other than data structures 501-D and 501-E) may be updated based on the information loaded to memory (e.g., the link costs of Link {D, B} and Link {D, C}) and further based on the previously computed lowest cost paths reflected in data structures 501. For example, as shown, data structure 501-B may be updated to reflect that paths from Nodes F and G to Node B have been discovered. As similarly discussed above, the cost of Path {F, D, B} is 11, which may be based on (e.g., may be the sum of) the link cost of Link {D, B} loaded at this iteration (10), added to the cost of Path {F, D} maintained in data structure 501-D (1).

Additionally, data structure 501-C may be updated to reflect that a lower cost path has been found at this iteration than was found in previous iterations. That is, Path {G, E, D, C}, discovered during this iteration based on the loading of Link {D, C} may be a lower cost path than Path {G, E, C} which was discovered in a previous iteration (e.g., as shown in FIG. 9A). Similarly, Path {F, D, C} may be a lower cost path than the previously discovered Path {F, E, C}.

As shown in FIG. 12, once Node D has been evaluated, the next node in backward search queue 401, Node C, may be evaluated. Here, the only higher priority neighbor of Node C is Node B, which has already been previously added to backward search queue 401. As such, backward search queue 401 may remain unchanged, inasmuch as no new nodes are added to backward search queue 401 at this stage.

Figure 13:
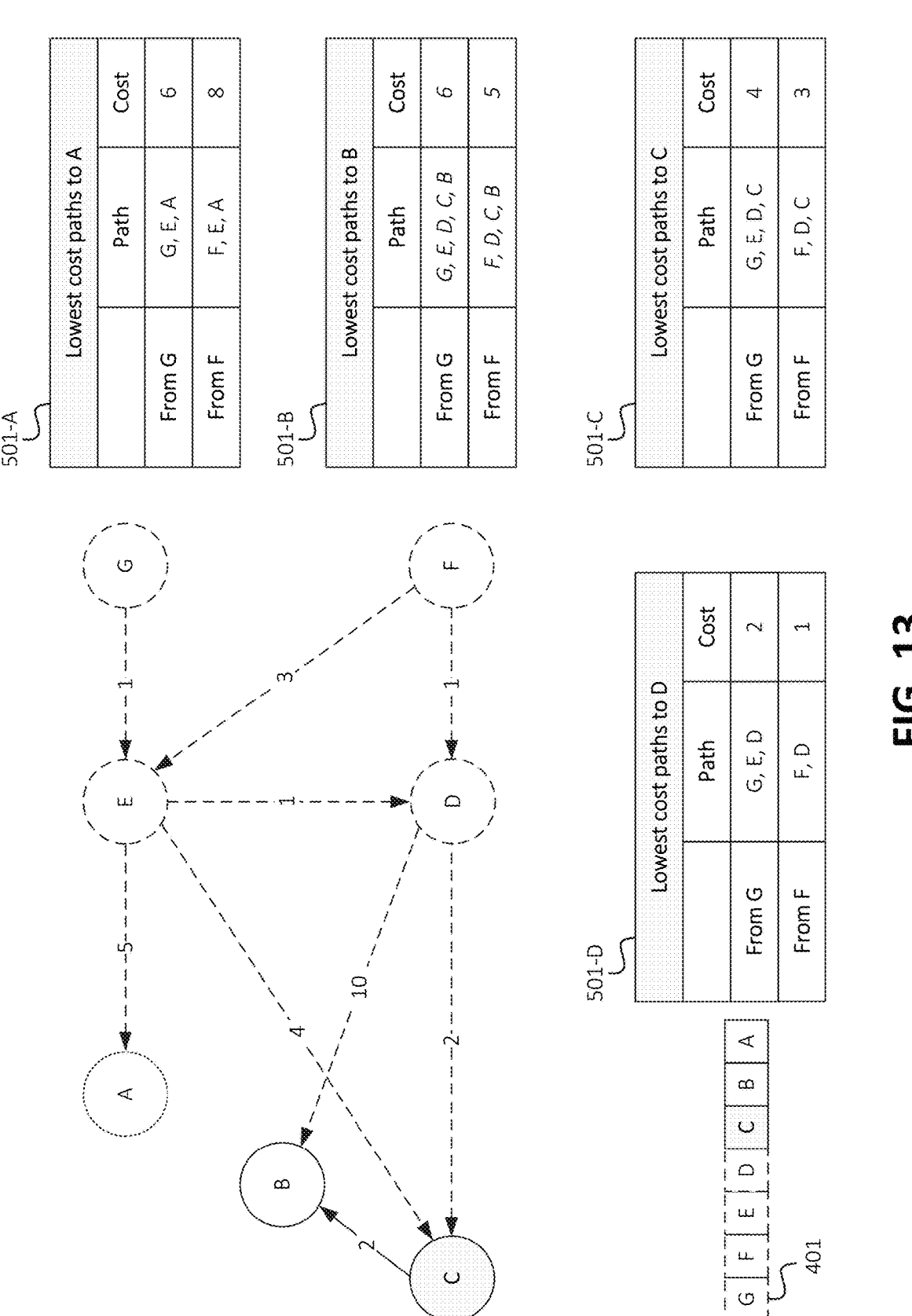

As shown in FIG. 13, the shortest cost paths to Nodes F and G (e.g., other than the shortest cost paths Nodes C, D, and E as maintained in data structures 501-C, 501-D, and 501-E) may be updated based on the information loaded at this iteration (e.g., the cost of Link {B, C}) as well as the previously computed shortest path costs maintained in data structures 501. With the added information of the cost of Link {B, C} (e.g., as loaded at this iteration), data structure 501-B may reflect lower cost paths than were previously discovered before the cost of Link {B, C} was considered. For example, the cost of Path {G, E, D, C, B} is lower than the previously computed shortest cost Path {G, E, D, B}, shown in FIG. 12. As similarly noted above, the cost of Path {G, E, D, C, B} may be computed based on the loaded link cost of Link {C, B} as well as the previously computed cost of Path {G, E, D, C}. That is, the cost of Path {G, E, D, C, B} may be computed without individually reloading the costs of Link {E, D}, Link {D, C}, and Link {C, B} into memory.

FIG. 14 illustrates the next iteration, in which Node B is evaluated. Here, no outgoing links from Node B are discovered, and therefore no new nodes are added to backward search queue 401. Additionally, since no outgoing links from Node B are discovered, no new shortest paths computations are performed, as no additional information is available based on which any shorter paths would be found. Similarly, as shown in FIG. 15, no outgoing links from Node A are discovered, and therefore no new nodes are added to backward search queue 401. Additionally, since no outgoing links from Node A are discovered, no new shortest paths computations are performed, as no additional information is available based on which any shorter paths would be found.

Figure 16:
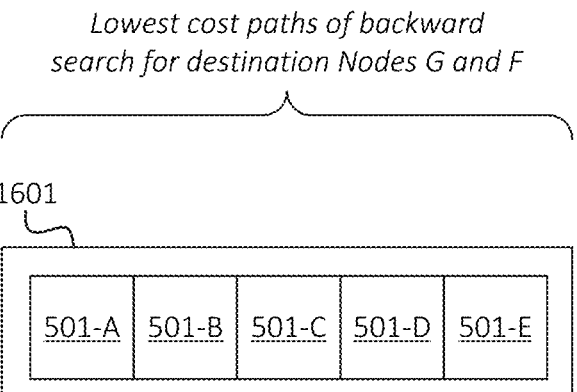

Thus, as shown in FIG. 16, the full set of shortest paths from each destination node (i.e., Nodes F and G in the examples provided herein) may have been discovered in accordance with the techniques described above. Data structure 1601 may include, may be derived from, and/or may otherwise be based on data structures 501 (e.g., data structures 501-A through 501-E). Data structure 1601 may include the same shortest paths that would be found via other techniques, such as techniques that identify the shortest path for each destination node (e.g., a Djikstra search), where such techniques include loading and reloading some of the same links to memory repeatedly.

FIGS. 17-21 conceptually represent such techniques that discover lowest cost paths from destination Nodes F and G by first discovering the lowest cost paths from one destination node (e.g., Node G) and then subsequently discovering the lowest cost paths from another destination node (e.g., Node F). While FIGS. 17-21 illustrate example procedures that may be used to individually determine shortest cost paths to each destination node, other procedures or techniques may be used to individually determine such paths. In any event, such procedures may ultimately require more loading of link costs to memory than procedures of some embodiments (e.g., as discussed above with respect to FIGS. 4-16).

Figure 17:
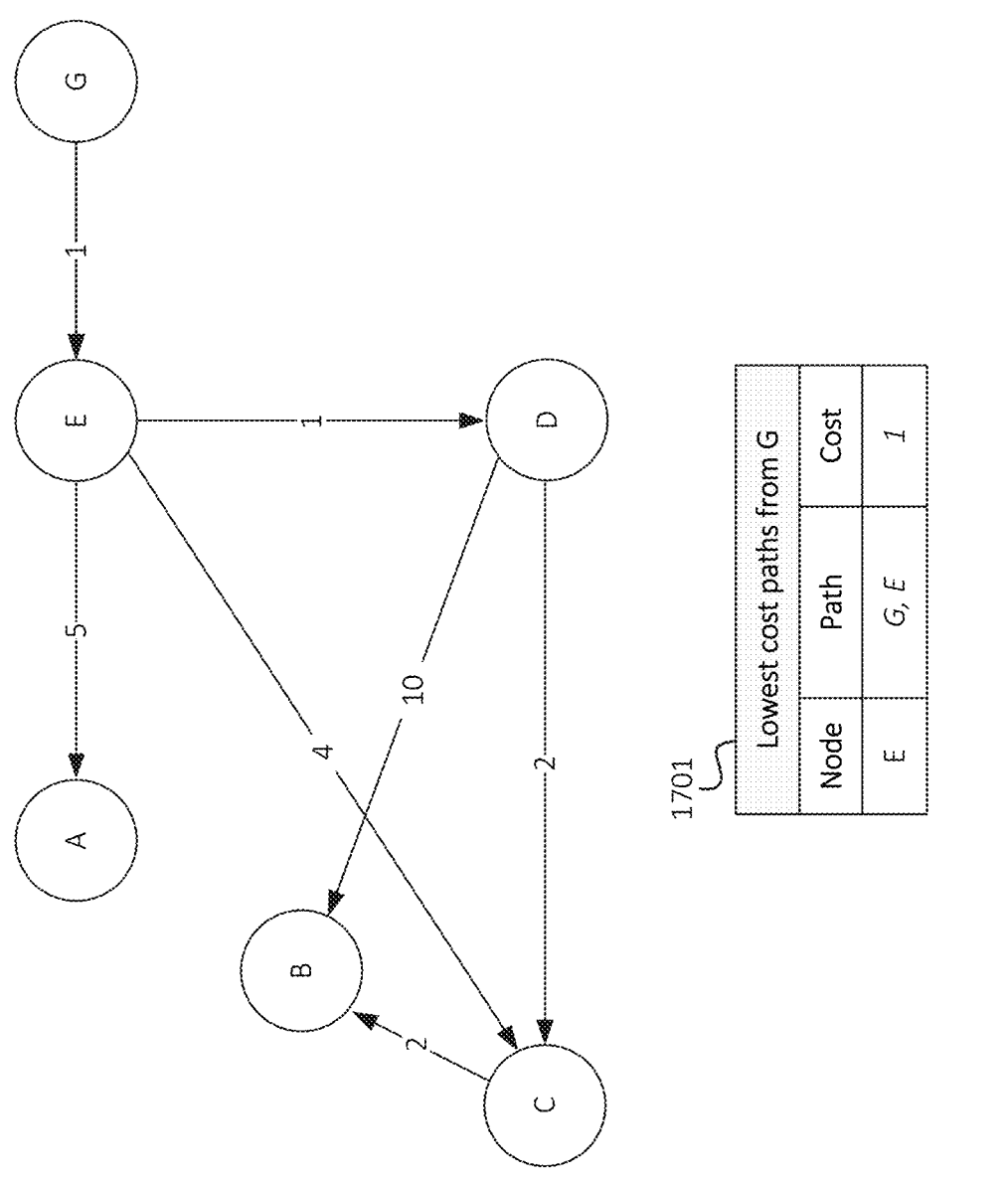
Figure 18:
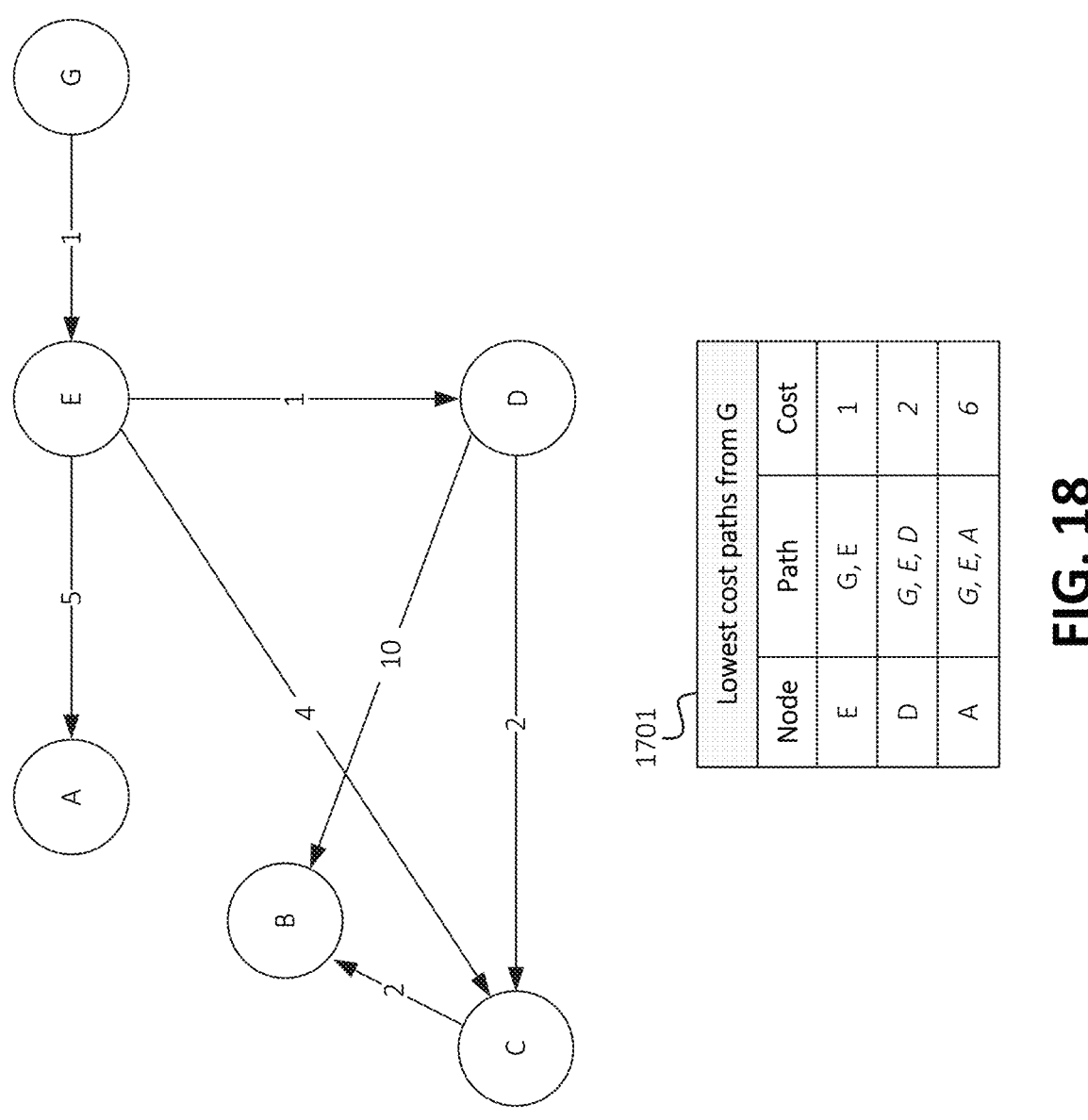
Figure 19:
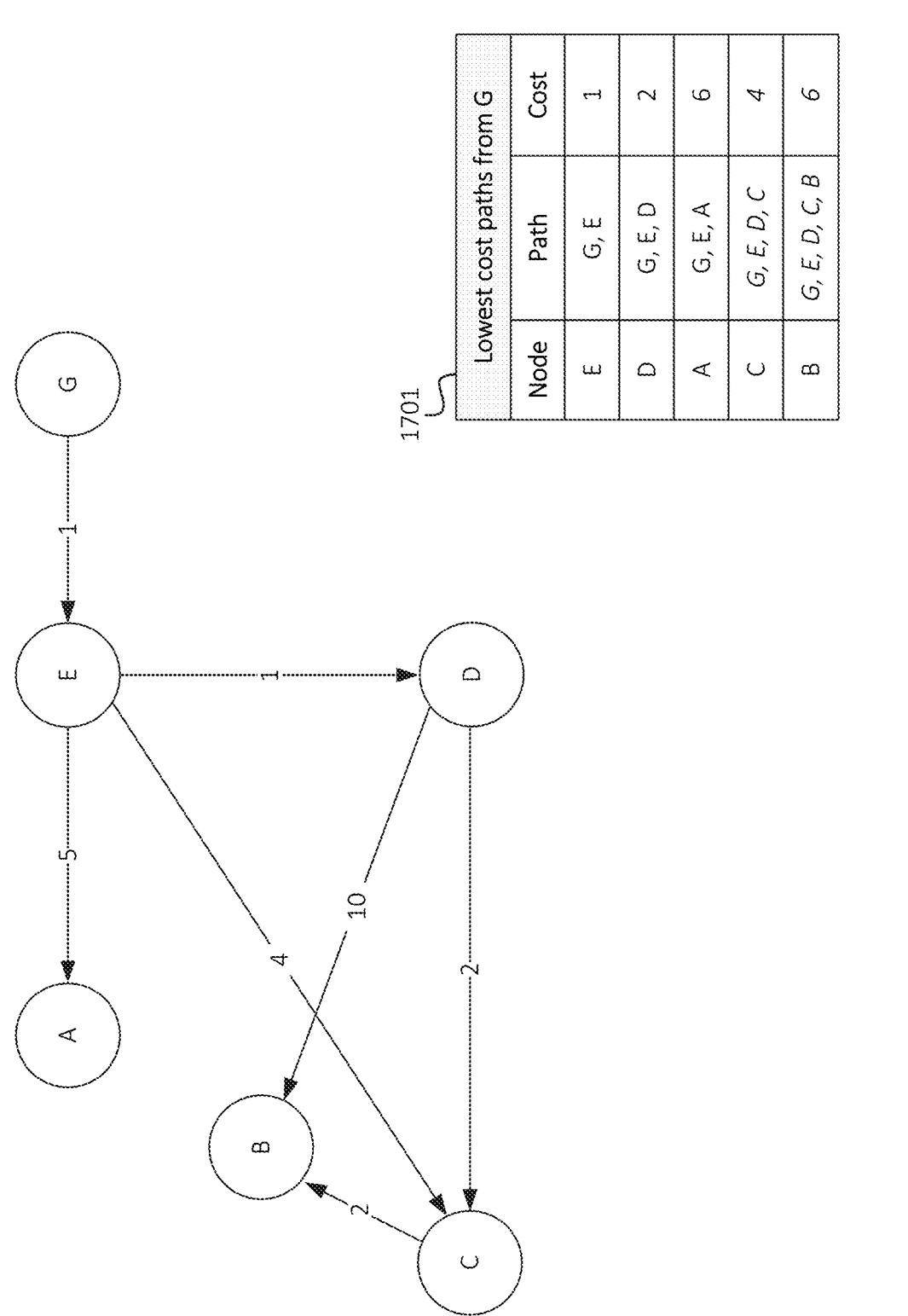

As shown in FIG. 17, for example, a backward search from a particular destination node (i.e., Node G, in this example) may be initialized. Data structure 1703, which maintains the lowest cost paths from Node G, may be updated to indicate that a path to Node E has been discovered, with a cost of 1. At a next step of this type of backward search, as shown in FIG. 18, paths to Nodes A and D may be discovered, with respective costs of 2 and 6. Computing the cost of Path {G, E, D}, for example, may include loading the link costs of Link {G, E} and Link {E, D} into memory. Computing the cost of Path {G, E, A} may include additionally loading the link cost of Link {E, A} into memory. As shown in FIG. 19, computing the shortest cost paths from Node G may continue with identifying paths to Nodes C and B. For example, Path {G, E, D, C} and Path {G, E, D, C, B} may be identified. Identifying these paths and the associated costs may include, for example, loading costs of Link {D, C} and Link {C, B} into memory. At this point, data structure 1701 may represent the complete set of shortest paths from Node G to all other nodes in the node map.

As shown in FIG. 20, a similar procedure may be performed to discover the shortest paths from Node F to all of the nodes in the node map. Since the outgoing links, and associated costs, from Node F are different from the outgoing links of Node G, the nodes may be traversed in a different order when computing the lowest cost paths of Node F than when computing the lowest cost paths of Node G. Due to memory limitations (e.g., processor cache size limitations), some of the links and costs that were loaded into memory during the computation of lowest costs for Node G may have been flushed out or removed from memory by the time that the same links and costs are needed to compute lowest cost paths for Node F. As these same link costs may be needed to compute lowest cost paths for Node F, the link costs may need to be reloaded into memory. On the other hand, the procedure of some embodiments (e.g., as discussed above with respect to FIGS. 4-16) removes the necessity to reload such link costs when computing lowest paths associated with multiple destinations, thereby improving the efficiency and speed of a computing system that computes such paths.

Figure 21:
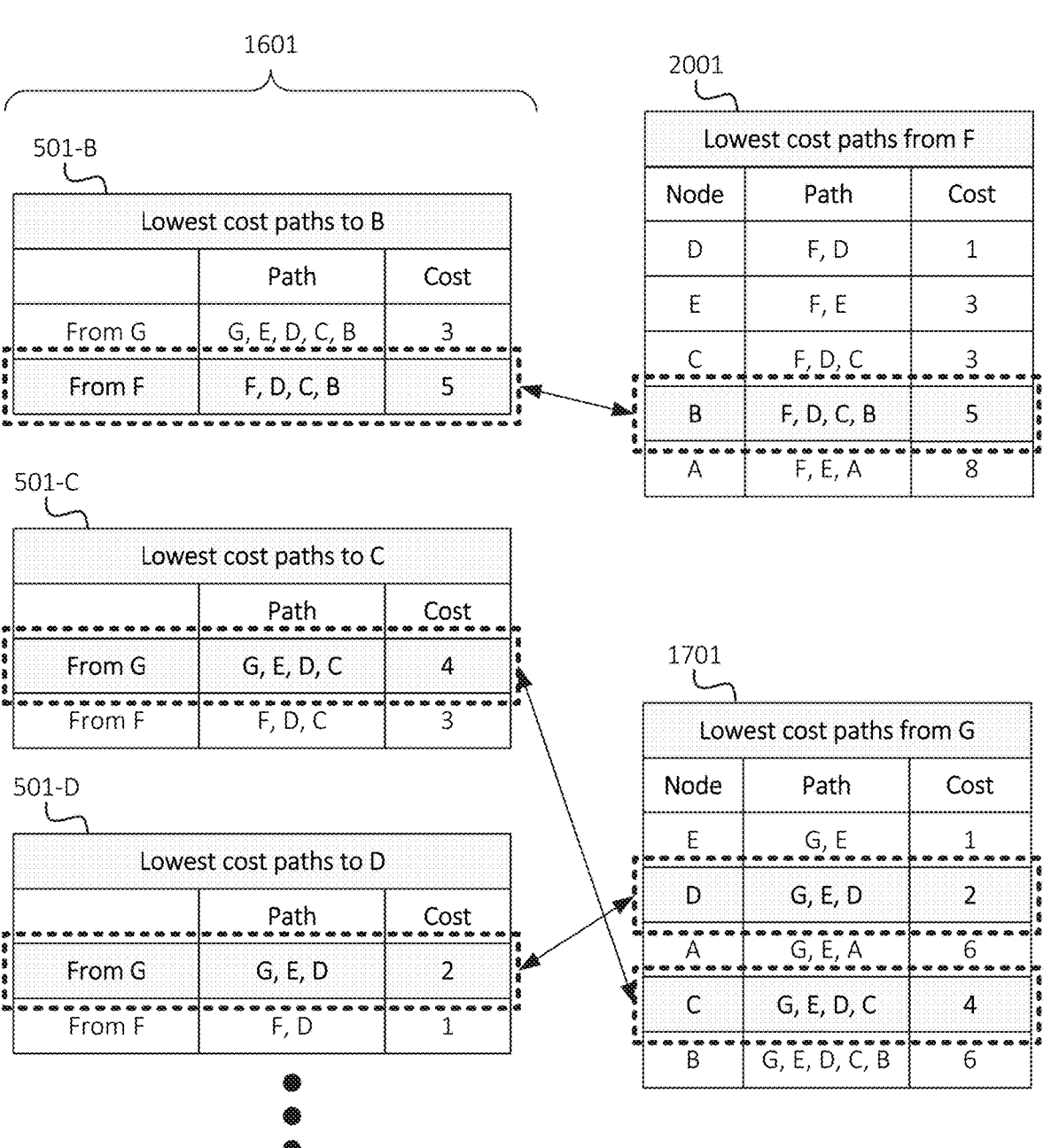
FIG. 21 illustrates example lowest cost paths discovered from the multi-destination backward search and the series of per-destination backward searches.

As shown in FIG. 21, the procedure of some embodiments (e.g., as discussed above with respect to FIGS. 4-16) may ultimately yield the same results (e.g., the same lowest cost paths) of a series of per-destination backward searches (e.g., as discussed above with respect to FIGS. 17-20). For example, data structure 1601, which may include and/or may otherwise be based on data structures 501, may include the same lowest cost paths (e.g., paths in ascending order of priority) to each destination from all reachable nodes in the node map as reflected in data structures 1701 and 2001. In some embodiments, data structure 1601 may be reformatted, translated, etc. to data structures 1701 and 2001, and/or to some other suitable format or arrangement.

Figure 22:
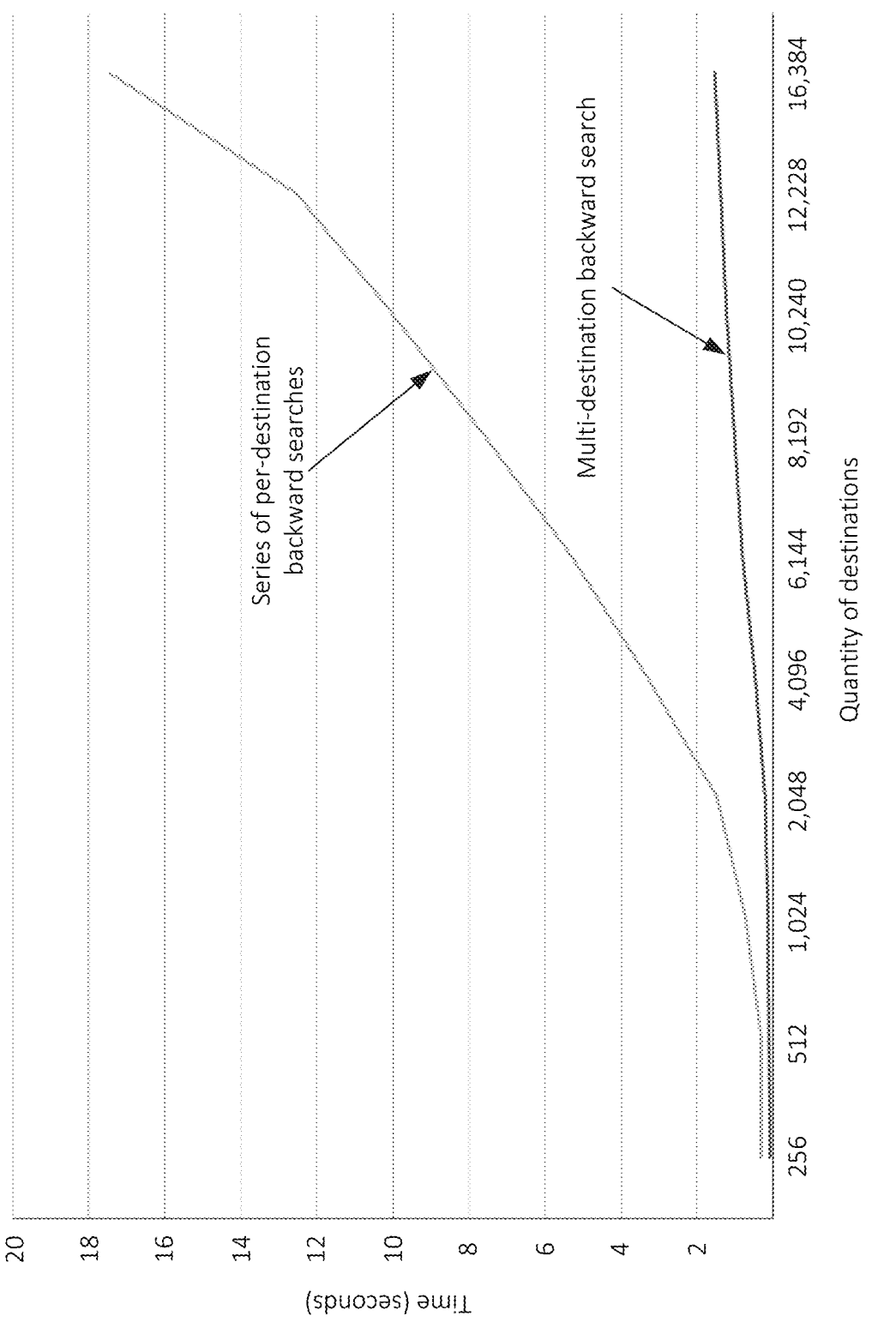
FIG. 22 illustrates example comparative performance results of a set of multi-destination backward searches and a set of series of per-destination backward searches.

As noted above, the multi-destination backward search procedure of embodiments described herein provides more efficient use of memory and therefore is able to be performed faster than a series of per-destination backward searches. That is, although the results of the multi-destination backward search procedure of some embodiments and a series of per-destination backward searches may be the same (i.e., the lowest cost backward search paths associated with a set of destinations of a node map), the multi-destination backward search procedure of some embodiments may be performed with more efficiency and better performance. FIG. 22 includes a graph that illustrates comparative results of performing series of per-destination backward searches and multi-destination backward searches on varying sets of destinations in a node map. As shown in the graph, for any quantity of destinations, the multi-destination backward search yielded faster processing time than the series of per-destination backward searches for the same quantity of destinations. Table 1 below provides the source data for the graph shown in FIG. 22.

TABLE 1

| Destinations | Per-destination backward search time (ms) | Multi-destination backward search time (ms) |
|---|---|---|
| 256 | 311 | 89 |
| 512 | 318 | 100 |
| 1,024 | 741 | 123 |
| 2,048 | 1,485 | 222 |
| 4,096 | 3,327 | 460 |
| 6,144 | 5,309 | 814 |
| 8,192 | 7,600 | 1,003 |
| 10,240 | 10,020 | 1,231 |
| 12,228 | 12,530 | 1,371 |
| 16,384 | 17,462 | 1,532 |

Compared to a series of per-destination backward searches where each destination must be processed separately, the multi-destination backward search procedure of some embodiments has a greatly improved worst case bound. Each per-destination backward search has a worst case runtime of $O(E+V*\log (V))$, where E refers to the quantity of links in the node map and V refers to the quantity of nodes in the node map. Thus for a series of per-destination backward searches for N destinations, a total runtime of $O(N(E+V*\log (V)))$ would be expected. In contrast, the multi-destination backward search procedure of some embodiments results in a $O(N*E+V*\log (V))$ runtime, which is a significantly shorter runtime.

Figure 23:
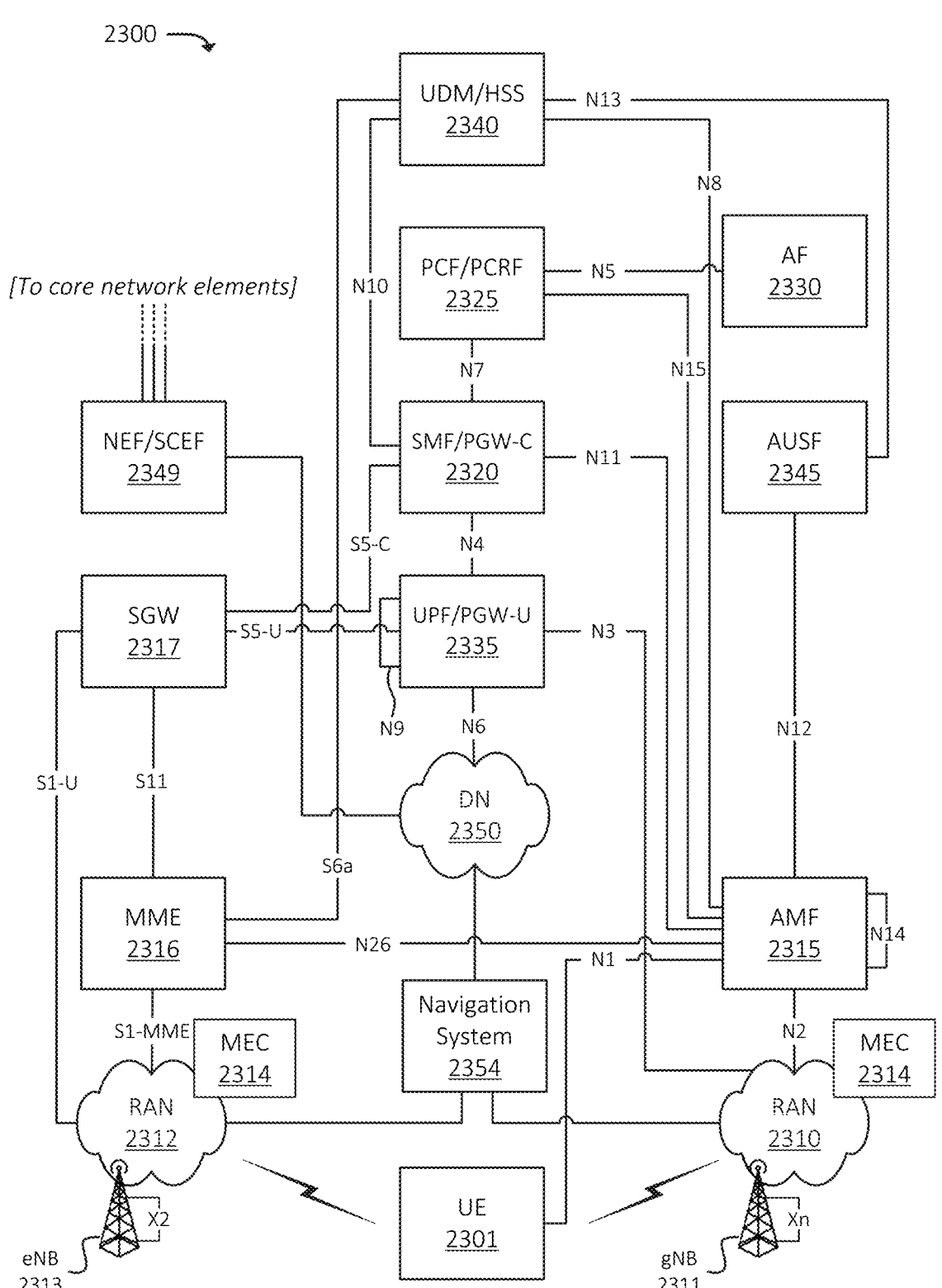
FIG. 23 illustrates example environments in which one or more embodiments, described herein, may be implemented.

FIG. 23 illustrates an example environment 2300, in which one or more embodiments may be implemented. In some embodiments, environment 2300 may correspond to a Fifth Generation ("5G") network, and/or may include elements of a 5G network. In some embodiments, environment 2300 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 2300 may represent or may include a 5G core ("5GC"). As shown, environment 2300 may include UE 2301, RAN 2310 (which may include one or more Next Generation Node Bs ("gNBs") 2311), RAN 2312 (which may include one or more evolved Node Bs ("eNBs") 2313), and various network functions such as Access and Mobility Management Function ("AMF") 2315, Mobility Management Entity ("MME") 2316, Serving Gateway ("SGW") 2317, Session Management Function ("SMF")/Packet Data Network ("PDN") Gateway ("PGW")-Control plane function ("PGW-C") 2320, Policy Control Function ("PCF")/Policy Charging and Rules Function ("PCRF") 2325, Application Function ("AF") 2330, User Plane Function ("UPF")/PGW-User plane function ("PGW-U") 2335, Unified Data Management ("UDM")/Home Subscriber Server ("HSS")

2340, Authentication Server Function ("AUSF") 2345, and Network Exposure Function ("NEF")/Service Capability Exposure Function ("SCEF") 2349. Environment 2300 may also include one or more networks, such as Data Network ("DN") 2350. Environment 2300 may include one or more additional devices or systems communicatively coupled to one or more networks (e.g., DN 2350), such as one or more Navigation Systems 2354.

The example shown in FIG. 23 illustrates one instance of each network component or function (e.g., one instance of SMF/PGW-C 2320, PCF/PCRF 2325, UPF/PGW-U 2335, UDM/HSS 2340, and/or AUSF 2345). In practice, environment 2300 may include multiple instances of such components or functions. For example, in some embodiments, environment 2300 may include multiple "slices" of a core network, where each slice includes a discrete and/or logical set of network functions (e.g., one slice may include a first instance of AMF 2315, SMF/PGW-C 2320, PCF/PCRF 2325, and/or UPF/PGW-U 2335, while another slice may include a second instance of AMF 2315, SMF/PGW-C 2320, PCF/PCRF 2325, and/or UPF/PGW-U 2335). The different slices may provide differentiated levels of service, such as service in accordance with different Quality of Service ("QoS") parameters.

The quantity of devices and/or networks, illustrated in FIG. 23, is provided for explanatory purposes only. In practice, environment 2300 may include additional devices and/or networks, fewer devices and/or networks, different devices and/or networks, or differently arranged devices and/or networks than illustrated in FIG. 23. For example, while not shown, environment 2300 may include devices that facilitate or enable communication between various components shown in environment 2300, such as routers, modems, gateways, switches, hubs, etc. In some implementations, one or more devices of environment 2300 may be physically integrated in, and/or may be physically attached to, one or more other devices of environment 2300. Alternatively, or additionally, one or more of the devices of environment 2300 may perform one or more network functions described as being performed by another one or more of the devices of environment 2300.

Additionally, one or more elements of environment 2300 may be implemented in a virtualized and/or containerized manner. For example, one or more of the elements of environment 2300 may be implemented by one or more Virtualized Network Functions ("VNFs"), Cloud-Native Network Functions ("CNFs"), etc. In such embodiments, environment 2300 may include, may implement, and/or may be communicatively coupled to an orchestration platform that provisions hardware resources, installs containers or applications, performs load balancing, and/or otherwise manages the deployment of such elements of environment 2300. In some embodiments, such orchestration and/or management of such elements of environment 2300 may be performed by, or in conjunction with, the open-source Kubernetes® application programming interface ("API") or some other suitable virtualization, containerization, and/or orchestration system.

Elements of environment 2300 may interconnect with each other and/or other devices via wired connections, wireless connections, or a combination of wired and wireless connections. Examples of interfaces or communication pathways between the elements of environment 2300, as shown in FIG. 23, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 23, such as Service-Based Interfaces ("SBIs"), including an Namf interface, an Nudm interface, an Npcf interface, an Nupf interface, an Nnef interface, an Nsmf interface, and/or one or more other SBIs.

UE 2301 may include a computation and communication device, such as a wireless mobile communication device that is capable of communicating with RAN 2310, RAN 2312, and/or DN 2350. UE 2301 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), a Fixed Wireless Access ("FWA") device, or another type of mobile computation and communication device. UE 2301 may send traffic to and/or receive traffic (e.g., user plane traffic) from DN 2350 via RAN 2310, RAN 2312, and/or UPF/PGW-U 2335.

RAN 2310 may be, or may include, a 5G RAN that includes one or more base stations (e.g., one or more gNBs 2311), via which UE 2301 may communicate with one or more other elements of environment 2300. UE 2301 may communicate with RAN 2310 via an air interface (e.g., as provided by gNB 2311). For instance, RAN 2310 may receive traffic (e.g., user plane traffic such as voice call traffic, data traffic, messaging traffic, etc.) from UE 2301 via the air interface, and may communicate the traffic to UPF/PGW-U 2335 and/or one or more other devices or networks. Further, RAN 2310 may receive signaling traffic, control plane traffic, etc. from UE 2301 via the air interface, and may communicate such signaling traffic, control plane traffic, etc. to AMF 2315 and/or one or more other devices or networks. Additionally, RAN 2310 may receive traffic intended for UE 2301 (e.g., from UPF/PGW-U 2335, AMF 2315, and/or one or more other devices or networks) and may communicate the traffic to UE 2301 via the air interface.

RAN 2312 may be, or may include, a LTE RAN that includes one or more base stations (e.g., one or more eNBs 2313), via which UE 2301 may communicate with one or more other elements of environment 2300. UE 2301 may communicate with RAN 2312 via an air interface (e.g., as provided by eNB 2313). For instance, RAN 2312 may receive traffic (e.g., user plane traffic such as voice call traffic, data traffic, messaging traffic, signaling traffic, etc.) from UE 2301 via the air interface, and may communicate the traffic to UPF/PGW-U 2335 (e.g., via SGW 2317) and/or one or more other devices or networks. Further, RAN 2312 may receive signaling traffic, control plane traffic, etc. from UE 2301 via the air interface, and may communicate such signaling traffic, control plane traffic, etc. to MME 2316 and/or one or more other devices or networks. Additionally, RAN 2312 may receive traffic intended for UE 2301 (e.g., from UPF/PGW-U 2335, MME 2316, SGW 2317, and/or one or more other devices or networks) and may communicate the traffic to UE 2301 via the air interface.

One or more RANs of environment 2300 (e.g., RAN 2310 and/or RAN 2312) may include, may implement, and/or may otherwise be communicatively coupled to one or more edge computing devices, such as one or more Multi-Access/Mobile Edge Computing ("MEC") devices (referred to sometimes herein simply as a "MECs") 2314. MECs 2314 may be co-located with wireless network infrastructure equipment of RANs 2310 and/or 2312 (e.g., one or more gNBs 2311 and/or one or more eNBs 2313, respectively). Additionally, or alternatively, MECs 2314 may otherwise be associated with geographical regions (e.g., coverage areas) of wireless network infrastructure equipment of RANs 2310 and/or 2312. In some embodiments, one or more MECs 2314 may be implemented by the same set of hardware resources, the same set of devices, etc. that implement wireless network infrastructure equipment of RANs 2310 and/or 2312. In some embodiments, one or more MECs 2314 may be implemented by different hardware resources, a different set of devices, etc. from hardware resources or devices that implement wireless network infrastructure equipment of RANs 2310 and/or 2312. In some embodiments, MECs 2314 may be communicatively coupled to wireless network infrastructure equipment of RANs 2310 and/or 2312 (e.g., via a high-speed and/or low-latency link such as a physical wired interface, a high-speed and/or low-latency wireless interface, or some other suitable communication pathway).

MECs 2314 may include hardware resources (e.g., configurable or provisionable hardware resources) that may be configured to provide services and/or otherwise process traffic to and/or from UE 2301, via RAN 2310 and/or 2312. For example, RAN 2310 and/or 2312 may route some traffic from UE 2301 (e.g., traffic associated with one or more particular services, applications, application types, etc.) to a respective MEC 2314 instead of to core network elements of 2300 (e.g., UPF/PGW-U 2335). MEC 2314 may accordingly provide services to UE 2301 by processing such traffic, performing one or more computations based on the received traffic, and providing traffic to UE 2301 via RAN 2310 and/or 2312. MEC 2314 may include, and/or may implement, some or all of the functionality described above with respect to UPF/PGW-U 2335, AF 2330, one or more application servers, and/or one or more other devices, systems, VNFs, CNFs, etc. In this manner, ultra-low latency services may be provided to UE 2301, as traffic does not need to traverse links (e.g., backhaul links) between RAN 2310 and/or 2312 and the core network.

AMF 2315 may include one or more devices, systems, VNFs, CNFs, etc., that perform operations to register UE 2301 with the 5G network, to establish bearer channels associated with a session with UE 2301, to hand off UE 2301 from the 5G network to another network, to hand off UE 2301 from the other network to the 5G network, manage mobility of UE 2301 between RANs 2310 and/or gNBs 2311, and/or to perform other operations. In some embodiments, the 5G network may include multiple AMFs 2315, which communicate with each other via the N14 interface (denoted in FIG. 23 by the line marked "N14" originating and terminating at AMF 2315).

MME 2316 may include one or more devices, systems, VNFs, CNFs, etc., that perform operations to register UE 2301 with the EPC, to establish bearer channels associated with a session with UE 2301, to hand off UE 2301 from the EPC to another network, to hand off UE 2301 from another network to the EPC, manage mobility of UE 2301 between RANs 2312 and/or eNBs 2313, and/or to perform other operations.

SGW 2317 may include one or more devices, systems, VNFs, CNFs, etc., that aggregate traffic received from one or more eNBs 2313 and send the aggregated traffic to an external network or device via UPF/PGW-U 2335. Additionally, SGW 2317 may aggregate traffic received from one or more UPF/PGW-Us 2335 and may send the aggregated traffic to one or more eNBs 2313. SGW 2317 may operate as an anchor for the user plane during inter-eNB handovers and as an anchor for mobility between different telecommunication networks or RANs (e.g., RANs 2310 and 2312).

SMF/PGW-C 2320 may include one or more devices, systems, VNFs, CNFs, etc., that gather, process, store, and/or provide information in a manner described herein. SMF/PGW-C 2320 may, for example, facilitate the establishment of communication sessions on behalf of UE 2301. In some embodiments, the establishment of communications sessions may be performed in accordance with one or more policies provided by PCF/PCRF 2325.

PCF/PCRF 2325 may include one or more devices, systems, VNFs, CNFs, etc., that aggregate information to and from the 5G network and/or other sources. PCF/PCRF 2325 may receive information regarding policies and/or subscriptions from one or more sources, such as subscriber databases and/or from one or more users (such as, for example, an administrator associated with PCF/PCRF 2325).

AF 2330 may include one or more devices, systems, VNFs, CNFs, etc., that receive, store, and/or provide information that may be used in determining parameters (e.g., quality of service parameters, charging parameters, or the like) for certain applications.

UPF/PGW-U 2335 may include one or more devices, systems, VNFs, CNFs, etc., that receive, store, and/or provide data (e.g., user plane data). For example, UPF/PGW-U 2335 may receive user plane data (e.g., voice call traffic, data traffic, etc.), destined for UE 2301, from DN 2350, and may forward the user plane data toward UE 2301 (e.g., via RAN 2310, SMF/PGW-C 2320, and/or one or more other devices). In some embodiments, multiple instances of UPF/PGW-U 2335 may be deployed (e.g., in different geographical locations), and the delivery of content to UE 2301 may be coordinated via the N9 interface (e.g., as denoted in FIG. 23 by the line marked "N9" originating and terminating at UPF/PGW-U 2335). Similarly, UPF/PGW-U 2335 may receive traffic from UE 2301 (e.g., via RAN 2310, RAN 2312, SMF/PGW-C 2320, and/or one or more other devices), and may forward the traffic toward DN 2350. In some embodiments, UPF/PGW-U 2335 may communicate (e.g., via the N4 interface) with SMF/PGW-C 2320, regarding user plane data processed by UPF/PGW-U 2335.

UDM/HSS 2340 and AUSF 2345 may include one or more devices, systems, VNFs, CNFs, etc., that manage, update, and/or store, in one or more memory devices associated with AUSF 2345 and/or UDM/HSS 2340, profile information associated with a subscriber. AUSF 2345 and/or UDM/HSS 2340 may perform authentication, authorization, and/or accounting operations associated with one or more UEs 2301 and/or one or more communication sessions associated with one or more UEs 2301.

DN 2350 may include one or more wired and/or wireless networks. For example, DN 2350 may include an Internet Protocol ("IP")-based PDN, a wide area network ("WAN") such as the Internet, a private enterprise network, and/or one or more other networks. UE 2301 may communicate, through DN 2350, with data servers, other UEs 2301, and/or to other servers or applications that are coupled to DN 2350. DN 2350 may be connected to one or more other networks, such as a public switched telephone network ("PSTN"), a public land mobile network ("PLMN"), and/or another network. DN 2350 may be connected to one or more devices, such as content providers, applications, web servers, and/or other devices, with which UE 2301 may communicate.

Navigation System 2354 may include one or more devices or systems that communicate with UE 2301 via 2350 and one or more elements of 2300 (e.g., via UPF/PGW-U 2335). Navigation System 2354 may include, for example, one or more application servers, content provider systems, web servers, or the like. Navigation System 2354 may, for example, implement one or more "server-side" applications that communicate with one or more "client-side" applications executed by UE 2301. Navigation System 2354 may provide services to UE 2301 such as responding to navigation queries, providing maps or routes to various destinations, etc. In some embodiments, one or more other devices or systems may communicate with UE 2301 via DN 2350, such as devices or systems that provide services as gaming services, videoconferencing services, messaging services, email services, web services, and/or other types of services. In some embodiments, Navigation System 2354 may be implemented by and/or may be communicatively coupled to one or more MECs 2314.

In some embodiments, devices external to the core network may communicate with one or more elements of environment 2300 (e.g., core network elements) via NEF/SCEF 2349. NEF/SCEF 2349 include one or more devices, systems, VNFs, CNFs, etc. that provide access to information, APIs, and/or other operations or mechanisms of one or more core network elements to devices or systems that are external to the core network (e.g., via 26N 2350). NEF/SCEF 2349 may maintain authorization and/or authentication information associated with such external devices or systems, such that NEF/SCEF 2349 is able to provide information, that is authorized to be provided, to the external devices or systems.

FIG. 24 illustrates an example process 2400 for performing a multi-destination backward search. In some embodiments, some or all of process 2400 may be performed by Navigation System 2354. In some embodiments, one or more other devices may perform some or all of process 2400 in concert with, and/or in lieu of, Navigation System 2354.

As shown, process 2400 may include receiving (at 2402) or otherwise identifying a node map. For example, as discussed above, the node map may be based on a real-world map with roads, landmarks, addresses, etc. The node map may be generated based contraction hierarchy techniques, in which nodes are associated with particular priority levels, importance scores, or other suitable attributes. As discussed above, the node map may include one or more shortcuts, which represent multiple nodes and/or links. Each link between respective nodes may be associated with a particular cost, score, or other suitable attribute.

Process 2400 may further include identifying (at 2404) potential destinations in the node map. For example, Navigation System 2354 may select a particular subset of the nodes included in the node map as potential destinations for which a backward search should be performed. As discussed above, the backward search may be part of a bidirectional search, in which complete paths (e.g., including a lowest cost path) are discovered between a starting node and a particular destination node. The backward search may be precomputed (e.g., independent of any particular starting node) in some instances.

Process 2400 may additionally include identifying (at 2406) a backward search space for the potential destinations. For example, Navigation System 2354 may identify nodes, in the node map, that are reachable from any destination node of the set of potential destinations. A given node in the node map may be considered as "reachable" from a given destination node if a path exists from the destination node to the given node, and if traversing the path includes traversing nodes in ascending order of priority. A given node in the node map may be considered as "unreachable" or "not reachable" from a given destination node if a path does not exist from the destination node to the given node, or if all existing paths from the destination node to the given node include traversing from a higher priority node to a lower priority node.

Process 2400 may also include initializing (at 2408) a backward search queue with the potential destinations. For example, as discussed above, Navigation System 2354 may initialize a backward search queue by including all of the potential destinations in the backward search queue. In some embodiments, Navigation System 2354 may add the potential destinations to the backward search queue in ascending order of priority (e.g., the lowest priority destination is placed at the head, or first position, of the queue).

Process 2400 may include iterating through blocks 2410-2414 for each node in the backward search queue. In a particular iteration, process 2400 may include adding (at 2410) higher priority neighbors of a current node to the queue in ascending order of priority. For example, starting with the first node in the queue in the first iteration, and continuing with the present node in the queue for subsequent iterations, Navigation System 2354 may identify all neighboring nodes (e.g., directly reachable via a single link) of the present node that are of a higher priority than the current node. Navigation System 2354 may add any identified neighboring nodes to the backward search queue, if such nodes are not already present in the queue. In accordance with some embodiments, the identified nodes may be placed in the queue in ascending order of priority, which may include inserting nodes into the queue before and after other nodes that were already in the queue (e.g., in order to maintain the ascending order of priority).

Process 2400 may additionally include identifying (at 2412) costs of outgoing links from the current node to the identified neighbors. For example, as discussed above, Navigation System 2354 may load such costs to memory (e.g., processor cache or other suitable volatile memory).

Process 2400 may also include computing (at 2414) lowest cost paths (e.g., to the potential destinations) in the node map using the identified link costs and any previously computed lowest cost paths. For example, as discussed above, Navigation System 2354 may identify all lowest cost paths that are discoverable between nodes of the node map and the potential destinations, based on the costs of the outgoing links from the current node (e.g., as identified and loaded at 2412). In a first iteration, since no previously computed lowest cost paths exist, Navigation System 2354 may select the next node in the queue and perform the next iteration of blocks 2410-2414. In second and subsequent iterations, situations may exist where the previously computed lowest cost paths are used to identify additional lowest cost paths, without reloading individual link costs to memory (e.g., as discussed above with respect to the example shown in FIG. 9B).

After computing the lowest cost paths based on the loaded information as well as (as applicable) any previously computed lowest cost paths, Navigation System 2354 may increment the current node to the next node in the queue, and continue with the next iteration of blocks 2410-2414. In the event that no "next" node exists in the queue, all lowest cost paths in the node map associated with the set of potential destinations have been found. In such instances, Navigation System 2354 may perform process 2400 again on another set of potential destinations.

Figure 25:
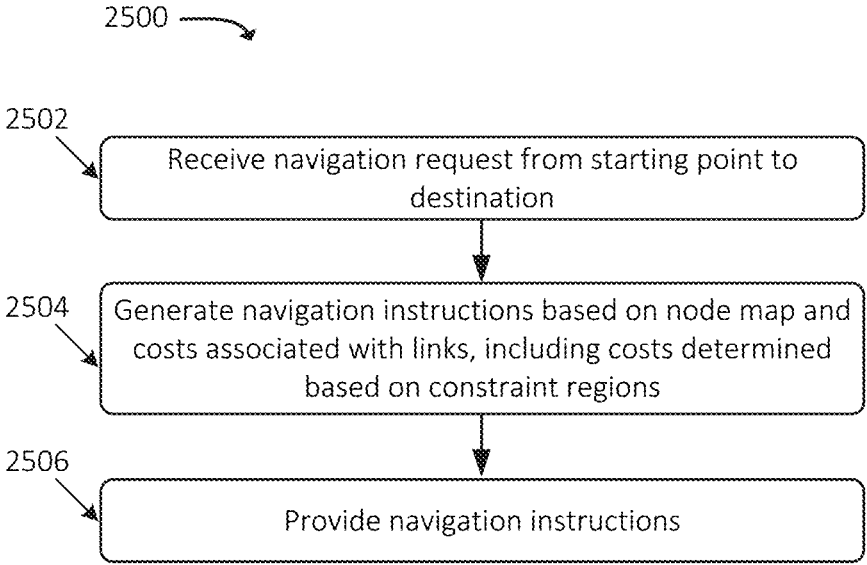
FIG. 25 illustrates an example process for using a node map to generate navigation instructions in response to a navigation request, in accordance with some embodiments.

FIG. 25 illustrates an example process 2500 for using a node map to generate navigation instructions in response to a navigation request, in accordance with some embodiments. In some embodiments, some or all of process 2500 may be performed by Navigation System 2354. In some embodiments, one or more other devices may perform some or all of process 2500 in concert with, and/or in lieu of, Navigation System 2354.

As shown, process 2500 may include receiving (at 2502) a navigation request. For example, Navigation System 2354 may receive a request to navigate from a starting point that is associated with particular node, in a node map, to a destination that is associated with another node in the node map. As discussed above, the node map may include and/or may be associated with one or more link constraints, turn constraints, constraint regions, costs associated with links, etc. In some embodiments, the node map may be associated with other types of constraints, features, rules, etc., which may be evaluated in addition to the techniques described herein.

Process 2500 may further include generating (at 2504) navigation instructions based on the node map. For example, Navigation System 2354 may use a bidirectional search or some other suitable type of search to identify one or more paths from the starting node to the destination node. For example, Navigation System 2354 may perform one or more searches originating from the starting node and/or the destination node. In some embodiments, the bidirectional search may include identifying nodes or paths that have a higher priority than a present node, and iteratively continuing to search for nodes or paths with higher priority than the present node. In this manner, one or more paths originating from the starting node may intersect with one or more paths originating from the destination node, and Navigation System 2354 may select a particular complete path (e.g., an intersection of a path originating from the starting node and a path originating from the destination node) based on cumulative cost and/or one or more other factors. As discussed above, the cost of a given path may be calculated based on whether such path or link includes one or more constraints and/or constraint regions. In some embodiments, some or all of the bidirectional search may be precomputed (e.g., prior to receiving the navigation request). In some embodiments, a portion of the bidirectional search may be precomputed (e.g., a backward portion of the bidirectional search), while a another portion of the bidirectional search may be computed after receiving the navigation request (e.g., a forward portion of the bidirectional search).

Process 2500 may additionally include providing (at 2506) the navigation instructions. For example, Navigation System 2354 may provide an indication of the path (determined at 2504) to a requesting device, such as UE 2301. UE 2301 may, in turn, present the navigation instructions via a display screen, audibly present the navigation instructions, or perform one or more other suitable operations to present the navigation instructions.

Figure 26:
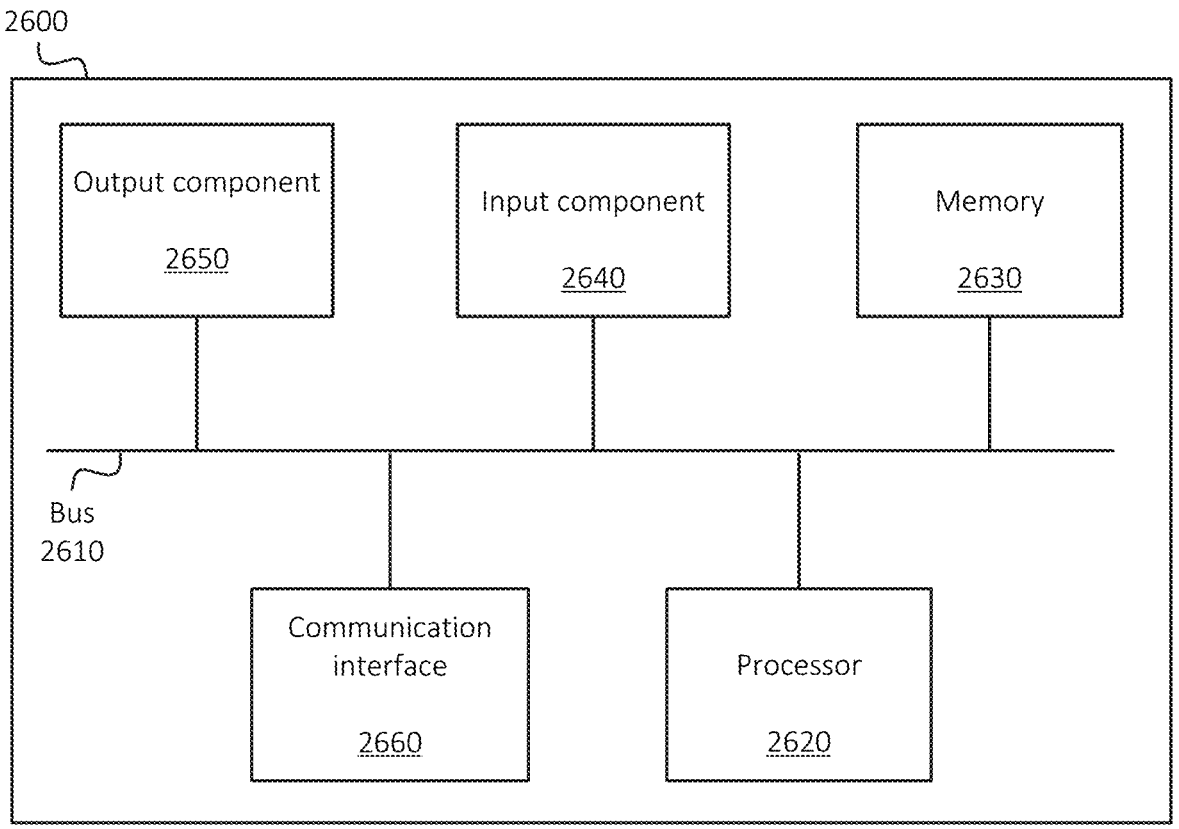
FIG. 26 illustrates example components of one or more devices, in accordance with one or more embodiments described herein.

FIG. 26 illustrates example components of device 2600. One or more of the devices described above may include one or more devices 2600. Device 2600 may include bus 2610, processor 2620, memory 2630, input component 2640, output component 2650, and communication interface 2660. In another implementation, device 2600 may include additional, fewer, different, or differently arranged components.

Bus 2610 may include one or more communication paths that permit communication among the components of device 2600. Processor 2620 may include a processor, microprocessor, a set of provisioned hardware resources of a cloud computing system, or other suitable type of hardware that interprets and/or executes instructions (e.g., processor-executable instructions). In some embodiments, processor 2620 may be or may include one or more hardware processors. Memory 2630 may include any type of dynamic storage device that may store information and instructions for execution by processor 2620, and/or any type of non-volatile storage device that may store information for use by processor 2620.

Input component 2640 may include a mechanism that permits an operator to input information to device 2600 and/or other receives or detects input from a source external to input component 2640, such as a touchpad, a touchscreen, a keyboard, a keypad, a button, a switch, a microphone or other audio input component, etc. In some embodiments, input component 2640 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 2650 may include a mechanism that outputs information to the operator, such as a display, a speaker, one or more light emitting diodes ("LEDs"), etc.

Communication interface 2660 may include any transceiver-like mechanism that enables device 2600 to communicate with other devices and/or systems (e.g., with RAN 2310, RAN 2312, DN 2350, etc.). For example, communication interface 2660 may include an Ethernet interface, an optical interface, a coaxial interface, or the like. Communication interface 2660 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 2600 may include more than one communication interface 2660. For instance, device 2600 may include an optical interface, a wireless interface, an Ethernet interface, and/or one or more other interfaces.

Device 2600 may perform certain operations relating to one or more processes described above. Device 2600 may perform these operations in response to processor 2620 executing instructions, such as software instructions, processor-executable instructions, etc. stored in a computer-readable medium, such as memory 2630. A computer-readable medium may be defined as a non-transitory memory device. A memory device may include space within a single physical memory device or spread across multiple physical memory devices. The instructions may be read into memory 2630 from another computer-readable medium or from another device. The instructions stored in memory 2630 may be processor-executable instructions that cause processor 2620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-24), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

receive a node map that includes a set of nodes and respective links between nodes, wherein each node is associated with a respective measure of priority and wherein each link is associated with a respective cost;

identify a set of destination nodes in the node map;

initialize a queue by adding the set of destination nodes to the queue;

compute lowest cost paths to each node reachable to each destination node of the set of destination nodes, wherein a first iteration of the computing includes, for a first node in the queue:

adding higher priority neighbors of the first node, which are not in the queue, to the queue;

loading, to a memory device, information indicating costs of outgoing links from the first node to the higher priority neighbors of the first node; and performing a first iteration of computing lowest cost paths associated with the set of destination nodes based on:

the costs of the outgoing links from the first node to the higher priority neighbors of the first node, and any previously computed lowest cost paths associated with the set of destination nodes, wherein a second iteration of the computing includes, for a second node that is a next node in the queue with respect to the first node:

loading, to the memory device, information indicating costs of outgoing links from the second node to higher priority neighbors of the second node, without loading the information indicating the costs of outgoing links from the first node to the higher priority neighbors of the first node; and performing a second iteration of computing lowest cost paths associated with the set of destination nodes based on:

the costs of the outgoing links from the second node to the higher priority neighbors of the second node, and any previously computed lowest cost paths associated with the set of destination nodes, including one or more lowest cost paths computed when performing the first iteration of computing the lowest cost paths;

receive a navigation request for a route between a particular starting node in the node map and a particular destination node of the set of destination nodes;

generate the requested route based on a particular computed lowest cost path associated with the particular destination node; and output, in response to the navigation request, the generated route.

2. The device of claim 1, wherein computing the lowest cost paths associated with a particular destination node of the set of destination nodes includes traversing the node map in ascending order of priority.

3. The device of claim 1, wherein the first iteration of computing lowest cost paths associated with the set of destination nodes includes identifying a first lowest cost path associated with a particular destination node based on a first set of identified costs of outgoing links from the first node to a first set of higher priority neighbors of the first node, and wherein the second iteration of computing lowest cost paths associated with the set of destination nodes includes identifying a second lowest cost path associated with the particular destination node, that is a lower cost than the first lowest cost path, based on a second set of identified costs of outgoing links from the second node to a second set of higher priority neighbors of the second node.

4. The device of claim 3, wherein the second iteration of computing lowest cost paths associated with the set of destination nodes further includes identifying the second lowest cost path associated with the particular destination node based on the first lowest cost path.

5. The device of claim 1, wherein the one or more processors are further configured to:

perform a bidirectional search of the node map that includes a forward search from the particular starting node and a backward search from the set of destination nodes, wherein the backward search from the set of destination nodes includes the computing of the lowest cost paths to each node reachable to each destination node of the set of destination nodes.

6. The device of claim 1, wherein adding higher priority neighbors of the first node, which are not in the queue, to the queue includes adding the higher priority neighbors of the first node, which are not in the queue, to the queue in order of ascending priority.

7. The device of claim 6, wherein the one or more processors are further configured to:

add the second node to the queue;

identify, after adding the second node to the queue and prior to adding the first node to the queue, that the first node is associated with a lower priority than the second node; and add the first node to the queue, wherein adding the first node to the queue includes placing the first node ahead of the second node in the queue based on identifying that the first node is associated with the lower priority than the second node.

8. A non-transitory computer-readable medium, storing a plurality of processor-executable instructions to:

receive a node map that includes a set of nodes and respective links between nodes, wherein each node is associated with a respective measure of priority and wherein each link is associated with a respective cost;

identify a set of destination nodes in the node map;

initialize a queue by adding the set of destination nodes to the queue;

compute lowest cost paths to each node reachable to each destination node of the set of destination nodes, wherein a first iteration of the computing includes, for a first node in the queue:

adding higher priority neighbors of the first node, which are not in the queue, to the queue;

loading, to a memory device, information indicating costs of outgoing links from the first node to the higher priority neighbors of the first node; and performing a first iteration of computing lowest cost paths associated with the set of destination nodes based on:

the costs of the outgoing links from the first node to the higher priority neighbors of the first node, and any previously computed lowest cost paths associated with the set of destination nodes, wherein a second iteration of the computing includes, for a second node that is a next node in the queue with respect to the first node:

loading, to the memory device, information indicating costs of outgoing links from the second node to higher priority neighbors of the second node, without loading the information indicating the costs of outgoing links from the first node to the higher priority neighbors of the first node; and performing a second iteration of computing lowest cost paths associated with the set of destination nodes based on:

the costs of the outgoing links from the second node to the higher priority neighbors of the second node, and any previously computed lowest cost paths associated with the set of destination nodes, including one or more lowest cost paths computed when performing the first iteration of computing the lowest cost paths;

receive a navigation request for a route between a particular starting node in the node map and a particular destination node of the set of destination nodes;

generate the requested route based on a particular computed lowest cost path associated with the particular destination node; and output, in response to the navigation request, the generated route.

9. The non-transitory computer-readable medium of claim 8, wherein computing the lowest cost paths associated with a particular destination node of the set of destination nodes includes traversing the node map in ascending order of priority.

10. The non-transitory computer-readable medium of claim 8, wherein the first iteration of computing lowest cost paths associated with the set of destination nodes includes identifying a first lowest cost path associated with a particular destination node based on a first set of identified costs of outgoing links from the first node to a first set of higher priority neighbors of the first node, and wherein the second iteration of computing lowest cost paths associated with the set of destination nodes includes identifying a second lowest cost path associated with the particular destination node, that is a lower cost than the first lowest cost path, based on a second set of identified costs of outgoing links from the second node to a second set of higher priority neighbors of the second node.

11. The non-transitory computer-readable medium of claim 10, wherein the second iteration of computing lowest cost paths associated with the set of destination nodes further includes identifying the second lowest cost path associated with the particular destination node based on the first lowest cost path.

12. The non-transitory computer-readable medium of claim 8, wherein the plurality of processor-executable instructions further include processor-executable instructions to:

perform a bidirectional search of the node map that includes a forward search from the particular starting node and a backward search from the set of destination nodes, wherein the backward search from the set of destination nodes includes the computing of the lowest cost paths to each node reachable to each destination node of the set of destination nodes.

13. The non-transitory computer-readable medium of claim 8, wherein adding higher priority neighbors of the first node, which are not in the queue, to the queue includes adding the higher priority neighbors of the first node, which are not in the queue, to the queue in order of ascending priority.

14. The non-transitory computer-readable medium of claim 13, wherein the plurality of processor-executable instructions further include processor-executable instructions to:

add the second node to the queue;

identify, after adding the second node to the queue and prior to adding the first node to the queue, that the first node is associated with a lower priority than the second node; and add the first node to the queue, wherein adding the first node to the queue includes placing the first node ahead of the second node in the queue based on identifying that the first node is associated with the lower priority than the second node.

15. A method, comprising:

receiving a node map that includes a set of nodes and respective links between nodes, wherein each node is associated with a respective measure of priority and wherein each link is associated with a respective cost;

identifying a set of destination nodes in the node map;

initializing a queue by adding the set of destination nodes to the queue;

computing lowest cost paths to each node reachable to each destination node of the set of destination nodes, wherein a first iteration of the computing includes, for a first node in the queue:

adding higher priority neighbors of the first node, which are not in the queue, to the queue;

loading, to a memory device, information indicating costs of outgoing links from the first node to the higher priority neighbors of the first node; and performing a first iteration of computing lowest cost paths associated with the set of destination nodes based on:

the costs of the outgoing links from the first node to the higher priority neighbors of the first node, and any previously computed lowest cost paths associated with the set of destination nodes, wherein a second iteration of the computing includes, for a second node that is a next node in the queue with respect to the first node:

loading, to the memory device, information indicating costs of outgoing links from the second node to higher priority neighbors of the second node, without loading the information indicating the costs of outgoing links from the first node to the higher priority neighbors of the first node; and performing a second iteration of computing lowest cost paths associated with the set of destination nodes based on:

the costs of the outgoing links from the second node to the higher priority neighbors of the second node, and any previously computed lowest cost paths associated with the set of destination nodes, including one or more lowest cost paths computed when performing the first iteration of computing the lowest cost paths;

receiving a navigation request for a route between a particular starting node in the node map and a particular destination node of the set of destination nodes;

generating the requested route based on a particular computed lowest cost path associated with the particular destination node; and outputting, in response to the navigation request, the generated route.

16. The method of claim 15, wherein computing the lowest cost paths associated with a particular destination node of the set of destination nodes includes traversing the node map in ascending order of priority.

17. The method of claim 15, wherein the first iteration of computing lowest cost paths associated with the set of destination nodes includes identifying a first lowest cost path associated with a particular destination node based on a first set of identified costs of outgoing links from the first node to a first set of higher priority neighbors of the first node, and wherein the second iteration of computing lowest cost paths associated with the set of destination nodes includes identifying a second lowest cost path associated with the particular destination node, that is a lower cost than the first lowest cost path, based on:

a second set of identified costs of outgoing links from a second node to a second set of higher priority neighbors of the second node, and the second lowest cost path associated with the particular destination node based on the first lowest cost path.

18. The method of claim 15, further comprising:

performing a bidirectional search of the node map that includes a forward search from the particular starting node and a backward search from the set of destination nodes, wherein the backward search from the set of destination nodes includes the computing of the lowest cost paths to each node reachable to each destination node of the set of destination nodes.

19. The method of claim 15, wherein adding higher priority neighbors of the first node, which are not in the queue, to the queue includes adding the higher priority neighbors of the first node, which are not in the queue, to the queue in order of ascending priority.

20. The method of claim 19, further comprising:

adding the second node to the queue;

identifying, after adding the second node to the queue and prior to adding the first node to the queue, that the first node is associated with a lower priority than the second node; and adding the first node to the queue, wherein adding the first node to the queue includes placing the first node ahead of the second node in the queue based on identifying that the first node is associated with the lower priority than the second node.

* * * * *